(12) United States Patent
Keating et al.

(10) Patent No.: US 11,999,635 B2
(45) Date of Patent: Jun. 4, 2024

(54) METHOD FOR DECONTAMINATING A LIQUID

(71) Applicant: Southern Spongolite Industries Pty Ltd, Albany (AU)

(72) Inventors: Peter James Keating, Forrestdale (AU); Julia Heide, Ashfield (AU)

(73) Assignee: SOUTHERN SPONGOLITE INDUSTRIES PTY LTD, Albany (AU)

( * ) Notice: Subject to any disclaimer, the term of this patent is extended or adjusted under 35 U.S.C. 154(b) by 470 days.

(21) Appl. No.: 17/293,553

(22) PCT Filed: Nov. 13, 2019

(86) PCT No.: PCT/AU2019/051247
§ 371 (c)(1),
(2) Date: May 13, 2021

(87) PCT Pub. No.: WO2020/097680
PCT Pub. Date: May 22, 2020

(65) Prior Publication Data
US 2023/0073040 A1    Mar. 9, 2023

(30) Foreign Application Priority Data

Nov. 13, 2018    (AU) ................................ 2018904321

(51) Int. Cl.
*C02F 1/28*    (2023.01)
*B01J 20/02*    (2006.01)
(Continued)

(52) U.S. Cl.
CPC .............. *C02F 1/288* (2013.01); *B01J 20/02* (2013.01); *B01J 20/10* (2013.01); *B01J 20/28011* (2013.01); *B01J 20/3078* (2013.01); *B01J 20/3085* (2013.01); *B01J 20/3433* (2013.01); *B01J 20/3071* (2013.01); *C02F 1/281* (2013.01); *C02F 2101/105* (2013.01); *C02F 2101/16* (2013.01); *C02F 2101/163* (2013.01);
(Continued)

(58) Field of Classification Search
CPC .... C02F 1/288; C02F 1/281; C02F 2101/105; C02F 2101/16; C02F 2101/163; C02F 2101/166; C02F 2103/001; C02F 2103/007; B01J 20/02; B01J 20/10; B01J 20/28011; B01J 20/3078; B01J 20/3085; B01J 20/3433; B01J 20/3071
USPC .................. 210/679, 691, 903, 906, 907
See application file for complete search history.

(56) References Cited

U.S. PATENT DOCUMENTS 5,457,265 A  * 10/1995  Heubner .................. A62D 3/38
                                                                    210/903

FOREIGN PATENT DOCUMENTS

| AU | 2012101627 A4 | 12/2012 |
| WO | 2016/205867 A1 | 12/2016 |
| WO | 2017/138822 A1 | 8/2017 |

OTHER PUBLICATIONS

International Search Report and Written Opinion dated Jan. 22, 2020 from International Application No. PCT/AU2019/051247 (Authorised officer, Pathma Fernando), 9 pages.

* cited by examiner

*Primary Examiner* — Fred Prince
(74) *Attorney, Agent, or Firm* — MH2 TECHNOLOGY LAW GROUP, LLP

(57) ABSTRACT

A method for the sorption of phosphorous and/or nitrogen from a liquid, the method comprising the step of contacting the liquid with a composition comprising spongolite.

11 Claims, 27 Drawing Sheets

(51) Int. Cl.
*B01J 20/10* (2006.01)
*B01J 20/28* (2006.01)
*B01J 20/30* (2006.01)
*B01J 20/34* (2006.01)
*C02F 101/10* (2006.01)
*C02F 101/16* (2006.01)
*C02F 103/00* (2006.01)

(52) U.S. Cl.
CPC .. *C02F 2101/166* (2013.01); *C02F 2103/001* (2013.01); *C02F 2103/007* (2013.01)

METHOD FOR DECONTAMINATING A LIQUID

CROSS-REFERENCE TO RELATED APPLICATIONS

This application is a U.S. National Stage application of PCT/AU2019/051247, filed 13 Nov. 2019, which claims priority to Australian Application No. 2018904321, filed 13 Nov. 2018, the entire disclosures of which are incorporated herein by reference in their entireties.

TECHNICAL FIELD

The present invention relates to a method for the removal of phosphorous and/or nitrogen from a liquid using spongolite, and a composition used in said method.

BACKGROUND ART

The use of phosphate fertilisers has caused concern throughout the world. In some areas, injudicious use of such fertiliser is prone to be leached from soil and washed into waterways. This promotes eutrophic states where algal blooms cause environmental harm. Eutrophication is the progressive over-fertilization of bodies of water with nutrients which induces the development of excessive plant growth and algae blooms, choking rivers, lakes and other waterways.

With the recent phasing out of phosphate-containing detergents in Australia, industrial run-off and agriculture have emerged as the dominant contributors to eutrophication. Currently, policy and regulations have been enacted in Australia whereby agricultural activity is restricted from applying phosphate to areas prone to phosphate leaching. This has reduced the agricultural productivity of such areas.

A material has been previously developed whereby the sodium and/or calcium ions in bentonite clay are exchanged for lanthanum to give the bentonite clay phosphate binding capacity (WO1998042626). The addition of the lanthanum to the bentonite allows the resulting complex to bind phosphates to form rhabdophane ($LaPO4 \cdot nH_2O$). This product is commercialised in Australia under the name Phoslock®. It is also known as Bentophos® in other countries. Application of the Phoslock® in water supplies contaminated with phosphates allows the Phoslock® to bind the phosphates and extract the phosphates from the water supply thus resulting in the decontamination of water supplies. Phoslock® is used in lake restoration projects as a tool to manage eutrophication and manage algal blooms (specifically cyanobacteria or blue green algae) by reducing phosphorus.

A major disadvantage of Phoslock® is that it is a fine powder which is not easily recoverable from a body of water treated with the material. Further, lanthanum is a relatively expensive mineral.

Thus there exists a need in the art for a product which is inexpensive and which can be easily recovered from a body of water. It is further desirable that the material is not harmful to the environment.

It is against this background that the present invention has been developed.

SUMMARY OF INVENTION

The present invention therefore provides a method for the sorption of phosphorous and/or nitrogen from a liquid, the method comprising the step of:
i) contacting the liquid with a composition comprising spongolite.

Preferably the liquid is water or an aqueous solution.

Preferably the phosphorous removed from the liquid is in the form of phosphate and/or the nitrogen removed from the liquid is in the form of nitrate, nitrite or ammonia.

The invention further provides a method for the sorption of phosphorous and/or nitrogen from a liquid, the method comprising the step of:
i) calcining the spongolite;
ii) contacting the liquid with the calcined spongolite.

Preferably the calcining process occurs:
a) at a temperature selected from any temperature within the range of 400° C. to 800° C.; and/or
b) for a period of time of between 10 minutes and 7 days.

The invention further provides a method for the sorption of phosphorous and/or nitrogen from a liquid, the method comprising the step of:
i) treating the spongolite with a soluble metal cation solution;
ii) contacting the liquid with the soluble metal cation treated spongolite.

Preferably the soluble metal cation is metal cation of iron, copper, manganese, magnesium, aluminium, vanadium or calcium. More preferably the soluble metal cation is a metal cation of iron, aluminium or copper.

Preferably the soluble metal cation is in the form of a salt. Preferably the metal salt is a sulphate salt, carbonate salt or chloride salt.

Preferably the soluble metal cation treatment is carried out:
a) using a metal salt at a concentration of between 1-20% (w/w) metal salt;
b) using a metal cation at a concentration of between 0.1-5% (w/w) metal cation, and/or
c) for a period of time between 10 minutes and 7 days.

The invention further provides a method for the sorption of phosphorous and/or nitrogen from a liquid, the method comprising the step of
i) treating the spongolite with a soluble metal cation solution;
ii) calcining the soluble metal cation treated spongolite;
iii) contacting the liquid with the calcined soluble metal cation treated spongolite.

The invention further provides a method for the sorption of phosphorous and/or nitrogen from a liquid, the method comprising the step of
i) calcining the spongolite;
ii) treating the calcined spongolite with a soluble metal cation solution;
iii) contacting the liquid with the calcined soluble metal cation treated spongolite.

The present invention provides a composition for the sorption of phosphorous and/or nitrogen from a liquid, comprising spongolite.

The invention further provides a composition for the sorption of phosphorous and/or nitrogen from a liquid, comprising calcined spongolite.

The invention further provides a composition for the sorption of phosphorous and/or nitrogen from a liquid, comprising soluble metal cation treated spongolite.

The invention further provides a composition for the sorption of phosphorous and/or nitrogen from a liquid, comprising calcined and soluble metal cation treated spongolite.

The invention further provides a composition comprising calcined spongolite.

The invention further provides a composition comprising soluble metal cation treated spongolite.

The invention further provides a composition comprising calcined and soluble metal cation treated spongolite.

The present invention provides a composition comprising spongolite when used for the sorption of phosphorous and/or nitrogen from a liquid.

The invention further provides a composition comprising calcined spongolite when used for the sorption of phosphorous and/or nitrogen from a liquid.

The invention further provides a composition comprising soluble metal cation treated spongolite when used for the sorption of phosphorous and/or nitrogen.

The invention further provides a composition comprising calcined and soluble metal cation treated spongolite when used for the sorption of phosphorous and/or nitrogen from a liquid.

The present invention provides a kit for the sorption of phosphorous and/or nitrogen from a liquid, the kit comprising:
 a) a composition comprising spongolite;
 b) instructions for use.

The present invention provides a kit for the sorption of phosphorous and/or nitrogen from a liquid, the kit comprising:
 a) a composition comprising calcined spongolite;
 b) instructions for use.

The present invention provides a kit for the sorption of phosphorous and/or nitrogen from a liquid, the kit comprising:
 a) a composition comprising soluble metal cation treated spongolite;
 b) instructions for use.

The present invention provides a kit for the sorption of phosphorous and/or nitrogen from a liquid, the kit comprising:
 a) a composition comprising calcined and soluble metal cation treated spongolite;
 b) instructions for use.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which.

DESCRIPTION OF THE INVENTION

Detailed Description of the Invention

Figure 1:
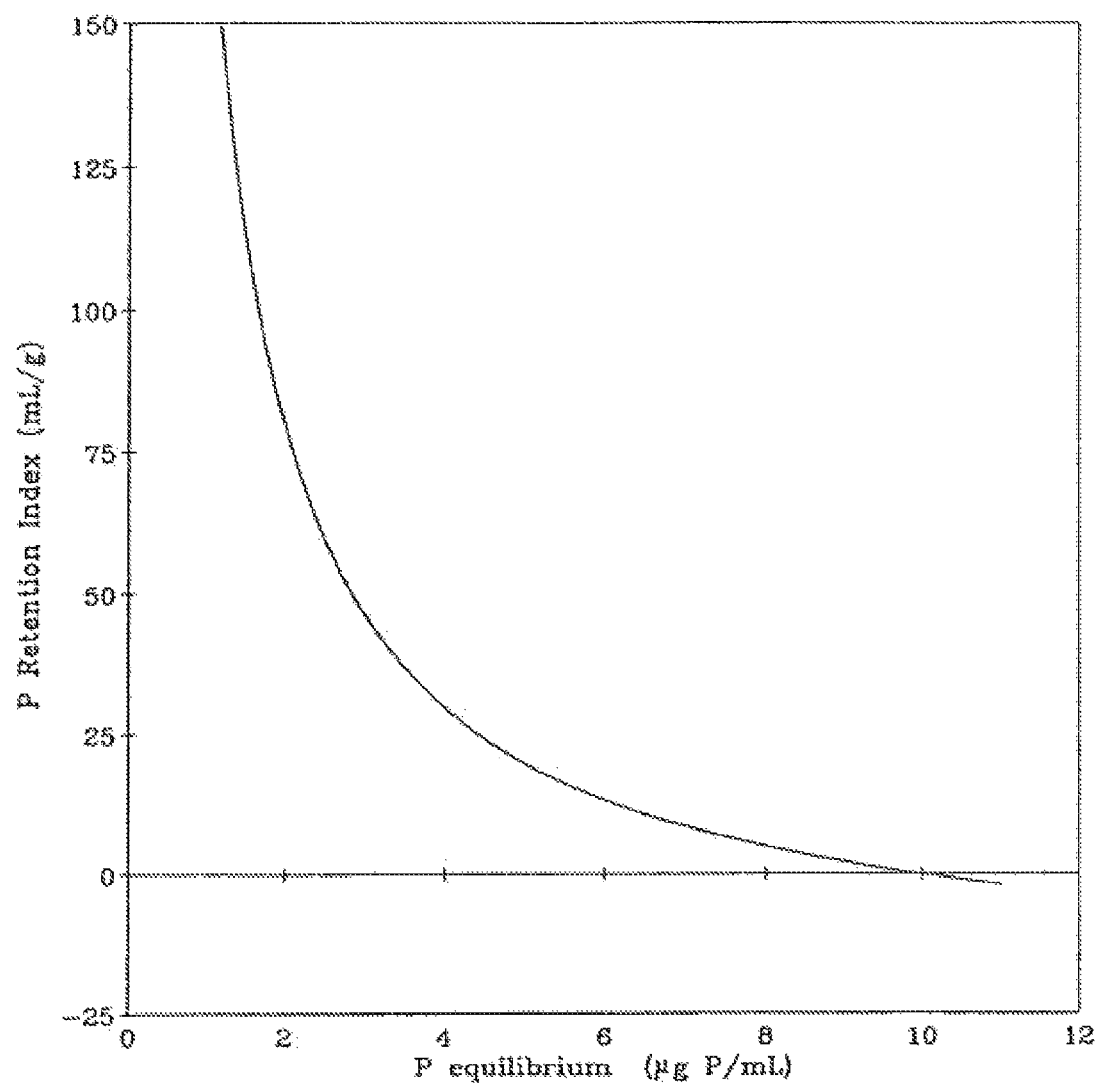
FIG. 1 is a graph showing the relationship between PRI and the phosphorous concentration in the supernatant solution (Source: Chem Centre).

Spongolite is a naturally occurring, but rare mineral, formed from the natural accumulation and fossilization of sea sponge sediments. The material is composed of sponge spicules, the majority of which are formed from silica. Spongolite is composed mostly of air voids, thus it has very low bulk density. This property means the mineral has high water holding capacity, and has previously been used in horticulture as a soil additive to improve the water holding capacity of soil.

Surprisingly, the present invention has found that spongolite can also be used to remove phosphorous and/or nitrogen from liquids through sorption into the spongolite of phosphorous and/or nitrogen contained within the liquid.

Sorption is a physical and chemical process by which one substance becomes attached to another. Sorption is a concomitant phenomenon of adsorption and absorption:

Absorption: the process in which a fluid is dissolved by a liquid or a solid (absorbent); the assimilation of molecular species throughout the bulk of the solid or liquid, involving the entire volume of the absorbing substance.

Adsorption: the process in which atoms, ions or molecules from a substance (gas, liquid or dissolved solid) adhere to a surface of the adsorbent; a surface-based process where a film of adsorbate is accumulated on the surface of the absorbent.

Method

The present invention provides a method for the sorption of phosphorous and/or nitrogen from a liquid, the method comprising the step of:

i) contacting the liquid with a composition comprising spongolite.

By "a composition comprising spongolite", it is contemplated that the composition may contain spongolite plus other materials, or may contain only spongolite. The spongolite of the composition (alone or in combination with other materials) may be treated spongolite, for example spongolite treated by calcining and/or transition metal sulphate treatment.

Spongolite can be mined and processed to produce a wide range of particle sizes, from 10-50 mm rocks, gravels, course sands to very fine silt sands. The spongolite may be ground, pulverised or otherwise treated to achieve the desired particle size. According to the present invention, the particles of spongolite may be any suitable size for the purpose chosen. For example, if the spongolite is to be provided as large blocks for placing in a river as the liquid, the spongolite may be in 1 $m^3$ blocks. Alternatively, if the spongolite is to be sprinkled into a waste water pond as the liquid, the particles may be a fine dust of 0.5 mm particles. If the spongolite is to be provided as blocks in a mesh bag for placement in a stream or river as the liquid, then preferably each spongolite particle is about 1-50 cm in diameter.

Preferably, the mined spongolite is washed with water after extraction from the ground to remove remnants of clay, sand and other undesirable soil components. The washed spongolite may then be dried prior to further use or treatment.

The method and composition of the present invention is preferably used for the sorption of phosphorous and/or nitrogen from a liquid.

Preferably the liquid is water. For example, the liquid may be a "water supply" or "body of water" including any accumulation of liquid, whether contained, or free flowing that could reasonably be construed to be "water-based" or "aqueous-based". The liquid may be pooled or free flowing natural or man-made water-based bodies such as lakes, rivers, streams, dams, run-off; waste water, effluent or sewage; or a liquid by-product of manufacturing processes such as from agricultural, mining (alumina, gold, nickel processing), food processing or beverage (brewing and winery) or other production industry that releases aqueous waste. In an embodiment of the invention, the liquid is wastewater. The following description expounds on the invention in terms of its use in the treatment of a liquid in the form of natural or artificial bodies of water such as rivers, streams, run-off, dams or lakes. However, the invention is not limited only to this context and a person of skill reading this application will and should recognise and understand that a wide varieties of liquids may be employed in the method of the invention without departing from the employed methodology.

Alternatively, the composition and method of the invention may also be used for the sorption of phosphorous and/or nitrogen from organic solvents and other non-aqueous solutions.

The method of the present invention results in the removal of the phosphorous and/or nitrogen from the liquid by way of sorption of the phosphorous and/or nitrogen into the composition comprising spongolite. Sorption of the phosphorous and/or nitrogen into the composition comprising spongolite may be via absorption and/or adsorption.

Preferably the phosphorous removed from the liquid is in the form of orthophosphate, also known simply as phosphate.

Preferably the nitrogen removed from the liquid is in the form of nitrate or nitrite. Most preferably, the nitrogen is in the form of nitrate.

Calcining

It has further been discovered that by calcining the spongolite, the phosphorous and/or nitrogen sorption capacity of the spongolite is increased.

Calcining is a thermal treatment process whereby a substance is heated to extremely high temperatures. Calcining changes the properties of the substance by, for example, removing gases and crystalline water. The process of calcination derives its name from the Latin calcinare (to burn lime) due to its most common application in the production of cement which involves the decomposition of limestone (calcium carbonate) to lime (calcium oxide) and carbon dioxide. However, the term is now applied more generally to the process of heating any mineral to high temperatures. The product of the calcination process is referred to as "calcine", regardless of the actual minerals undergoing thermal treatment. In the present application, the term "calcining" refers to the heating of spongolite to change its properties. The term "calcine" refers to the spongolite after heating.

Calcination is carried out in a calciner in the form of furnaces or reactors (sometimes referred to as kilns) of various designs including shaft furnaces, rotary kilns, multiple hearth furnaces, and fluidized bed reactors. One example of a calciner is a steel cylinder that rotates inside a heated furnace and performs indirect high-temperature processing within a controlled atmosphere.

Surprisingly, the present invention has found that calcining spongolite increases the ability of the spongolite to bind phosphorous and/or nitrogen. The invention provides a method for the sorption of phosphorous and/or nitrogen from a liquid, the method comprising contacting the liquid with a composition comprising spongolite wherein the spongolite is calcined prior to contacting the liquid.

There is therefore provided a method for the sorption of phosphorous and/or nitrogen from a liquid, the method comprising the step of:

i) calcining the spongolite;
ii) contacting the liquid with the calcined spongolite.

Without being held to any theory, it is believed that the spicules in the spongolite crystallise during calcining. The calcining process decomposes hydrated minerals such as amorphous silica and removes crystalline water.

It is further hypothesised that, during the calcining process, metals naturally present in the spongolite increase their oxidation state (valency). Spongolite is a very heterogeneous material and contains a range of trace elements. These trace elements may include metals such as transition metals, including the transition metals iron (0.6-6.8%), and chromium (28-54 mg/kg); and the related metal barium (17-54 mg/kg). The phosphorous and/or nitrogen binding properties of spongolite may be increased by an increase in the oxidation state of these naturally occurring metals such as transition metals and related metals.

Spongolite has naturally occurring phosphorous sorption capabilities, with a phosphorous retention index (PRI) of between about 10-50, or about 19-28. Spongolite also has naturally occurring nitrogen sorption capabilities, with a Nitrogen Retention capability of between about 0-5, when transferring the calculation of the phosphorous retention index into a nitrate retention index (NRI). This naturally occurring PRI may be due to the large pores of the spongolite and the different trace elements in its natural composition. However, by calcining spongolite in accordance with the procedures described herein, the PRI of the spongolite may be increased by at least 10-fold, more preferably 15-fold, 20-fold or 30-fold.

The PRI of the spongolite after calcining may be at least 50, 100, 150, 200, 250, 300, 350, 400, 450, 500, 550, or 600. It may be between 100-600, 100-500, 200-600, 200-500, 200-400. Optionally, the PRI of the spongolite after calcining is between 50-600 or 50-500. This increase in PRI allows the spongolite to more tightly sorb and hold the phosphorous.

The Nitrogen Retention capability ("NRI") of the spongolite after calcining may be at least 1, 5, 10, 20, 30, 40, 50, 100, 150, 200, 250, 300, 350, 400, 450, 500, 550, or 600. It may be between 100-600, 100-500, 200-600, 200-500, 200-400. Optionally, the Nitrogen Retention capability of the spongolite after calcining is between 1-600, 1-250, 50-600 or 50-500. This increase in Nitrogen Retention capability allows the spongolite to more tightly sorb and hold the nitrogen.

Without being bound by theory, the increase in the ability of the spongolite to bind phosphorous and/or nitrogen is hypothesised to result from a change in the heterogeneous structure of the spongolite during the crystallisation process. It is hypothesised that the calcining process increases the surface area of the spongolite and exposes more of the naturally occurring metals, particularly transition metals, which bind phosphate. As the spongolite may contain high amounts of naturally occurring metals, particularly transition metals (such as iron) naturally, calcining of the spongolite increases the oxidation state of the naturally occurring metals, particularly transition metals and therefore the phosphorous sorption capacity of the spongolite. This allows the spongolite to more tightly sorb and hold the phosphorous and/or nitrogen.

In one embodiment, the calcining process occurs at a temperature selected from any temperature within the range of 400° C. to 800° C. For example, the calcine process may occur at a temperature selected from the group consisting of about: 400° C., 425° C., 450° C., 475° C., 500° C., 525° C., 550° C., 575° C., 600° C., 625° C., 650° C., 675° C., 700° C., 725° C., 750° C., 775° C. and 800° C. The calcining may occur at a temperature of between about 400° C. and 800° C., 500° C. and 800° C., 600° C. and 800° C., 400° C. and 600° C., 500° C. and 600° C., 400° C. and 700° C., 500° C. and 700° C., or 600° C. and 800° C. In a preferred embodiment, the calcine process occurs between 600° C. to 700° C. More preferably, the calcine process occurs at 650° C., 675° C., 700° C. or 750° C., or between about 600° C. and 800° C.

In one embodiment, the calcining process occurs for a period of time between 30 minutes and 7 days, 30 minutes and 6 days, 30 minutes and 5 days, 30 minutes and 4 days, 30 minutes and 3 days, 30 minutes and 2 days, 30 minutes and 24 hours, 30 minutes and 18 hours, 30 minutes and 12 hours, 30 minutes and 6 hours, 30 minutes and 1 hour, 1 hour and 7 days, 1 hour and 6 days, 1 hour and 5 days, 1 hour and 4 days, 1 hour and 3 days, 1 hour and 2 days, 1 hour and 24 hours, 1 hour and 18 hours, 1 hour and 12 hours, 1 hour and 6 hours, or 1 hour and 2 hours.

In a preferred embodiment, the calcining occurs:
at a temperature between 400° C. and 800° C. for a period of time of between:
30 minutes and 7 days;
30 minutes and 24 hours;
1 hour and 6 hours; or
at a temperature between 600° C. and 750° C. for a period of time of between:
30 minutes and 7 days;
30 minutes and 24 hours;
1 hour and 6 hours; or
at a temperature between 650° C. and 700° C. for a period of time of between:
30 minutes and 7 days;
30 minutes and 24 hours;
1 hour and 6 hours.

Soluble Metal Cation Treatment

It has been further discovered by the present inventors that if the spongolite is treated with a soluble metal cation such as iron, manganese, copper, aluminium, magnesium or calcium cations, the phosphorous and/or nitrogen sorption capacity of the spongolite is significantly increased compared to spongolite which has not been treated. There is therefore provided a method for the sorption of phosphorous and/or nitrogen from a liquid, the method comprising contacting the liquid with a composition comprising spongolite wherein the spongolite is treated with a soluble metal cation solution and/or calcined prior to contacting the liquid.

The invention therefore provides a method for the sorption of phosphorous and/or nitrogen from a liquid, the method comprising the steps of:
i) treating the spongolite with a soluble metal cation solution; and
ii) contacting the liquid with the soluble metal cation treated spongolite.

Preferably the metal cation enters actively into chemical reactions and can form an oxide. They preferably have a solid state at room temperature. Preferably, the soluble metal cation is a cation from a metal with multiple positive oxidation states. Preferably the soluble metal cation has a valency between +1 and +7, more preferably the metal cation has a valency of +2 or +3 when used to prepare the spongolite. The metal cation can be a transition metal, post-transition metal, alkaline earth metal, rare earth element (lanthanoids).

Preferably the soluble metal cation is metal cation of iron, copper, manganese, magnesium, aluminium, vanadium or calcium. More preferably the soluble metal cation is metal cation of iron, aluminium or copper.

The positive oxidation state of the soluble metal cation is considered as crucial for phosphate binding, due to the negative charge of phosphate ions ($PO_4^{3-}$) of −3. For example, iron commonly has one of two oxidation states: +2 or +3. It is expected that iron and phosphate ions form iron(II)phosphate ($Fe_3(PO_4)_2$) and iron(III)phosphate ($FePO_4$) which are insoluble. A similar binding mechanism is expected to occur for copper in the form of copper(II) phosphate ($Cu_3(PO_4)_2$) and manganese as manganese(II) phosphate ($Mn_3(PO_4)_2$). Similarly, nitrite and nitrate ions have negative charges and bind to the positively charged soluble metal cations e.g. iron(III)nitrate $Fe(NO_3)_3$ and copper(II)nitrate $Cu(NO_3)_2$.

The soluble metal cation is preferably a metal cation of a metal that is cheap enough to be commercially feasible for use in large volume liquid treatment, for example the treatment of a liquid in the form of a river, water catchment or commercial effluent stream.

It is further preferred that the soluble metal cation is a metal cation of a metal that is environmentally benign and will not cause additional environment impact if any metal cations emerge from binding to the spongolite. Furthermore, if the spongolite were retain in the liquid, for example if small particle size spongolite were spread over a liquid in the form of a dam and then left to sink to the bottom, then it is desirable that the metal in the spongolite does not cause major detrimental environmental effects from its presence.

It is proposed that the phosphorous and/or nitrogen contained within the liquid strongly binds to the metal of the soluble metal cation that has complexed tightly with the spongolite. Therefore on sorption with the metal cations within the spongolite, the phosphorous and/or nitrogen is tightly bound and effectively immobilised in the spongolite.

The phosphorous and/or nitrogen is therefore unavailable to most organisms in the liquid, assisting to prevent, for example, algal blooms caused by excess free phosphorous and/or nitrogen in the liquid. It also results in the physical removal of the phosphorous and/or nitrogen (which is immobilised in the spongolite) from the liquid when the spongolite is removed from the liquid.

Without being bound by theory, it is further hypothesised that during the calcining process, the soluble metal cations increase their oxidation state, and that achieving this positive oxidation state enables the metals to bind to negatively charged phosphate ($PO_4^{3-}$), nitrite ($NO_2^-$) and nitrate ions ($NO_3^-$).

With particular reference to the use of iron as the metal in the soluble metal cation treatment, iron forms an extremely stable, redox-insensitive complex with phosphorous, nitrite and nitrate under most common environmental conditions. The iron may be ferrous or ferric iron.

In a preferred embodiment, the soluble metal cation is in the form of a salt. Preferably the metal salt is a sulphate salt, carbonate salt or chloride salt.

The invention therefore provides a method for the sorption of phosphorous and/or nitrogen from a liquid, the method comprising the step of
i) treating the spongolite with a soluble metal cation solution;
ii) calcining the soluble metal cation treated spongolite;
iii) contacting the liquid with the calcined soluble metal cation treated spongolite.

The invention also provides a method for the sorption of phosphorous and/or nitrogen from a liquid, the method comprising the step of i) calcining the spongolite;
ii) treating the calcined spongolite with a soluble metal cation solution;
iii) contacting the liquid with the calcined soluble metal cation treated spongolite.

It is proposed that the optimum calcining temperature for spongolite soaked in a solution containing a soluble metal cation is related to a change of oxidation state of the metal. For example, ferrous sulphate heptahydrate ($Fe_2SO_4*7H_2O$) in spongolite contains iron with an oxidation state of +2. During calcining, the high temperature activates the dehydration and oxidation process resulting in the decomposition of ferrous sulphate heptahydrate to ferric oxide ($Fe_2O_3$) and sulphur trioxide ($SO_3$). Ferric oxide has an oxidation state of +3 and hence is likely to attract and bind phosphate ($PO_4^{3-}$) and/or nitrate ($NO_3^-$).

In a preferred embodiment, the spongolite is treated with a soluble metal cation solution by placing the spongolite into a solution containing a metal salt at a concentration between 1-20% (w/w) metal salt for a period of time between 10 minutes and 1 week. In one embodiment, the spongolite is treated with a metal salt solution by placing the spongolite into a solution containing a metal salt at a concentration between 1-20% (w/w) metal salt for a period of time between 1-6 hours.

Metal cation treatment of the spongolite can be carried out using a range of concentrations from, for example, 1-20% (w/w) metal salt. In a preferred embodiment, the concentration of the metal salt in the solution is selected from the group consisting of: 1-5%, 1-10%, 1-15%, 1-20%, 5-10%, 5-15%, 5-20%, 10-15%, and 10-20% (w/w) metal salt. Preferably the soluble metal cation is metal cation of iron, copper, manganese, magnesium, aluminium, vanadium or calcium. More preferably the soluble metal cation is metal cation of iron, aluminium or copper. Preferably the metal salt is a sulphate salt, carbonate salt or chloride salt. Preferably, the metal salt is iron sulphate, aluminium sulphate manganese sulphate or copper sulphate.

In a preferred embodiment, the spongolite is treated with a soluble metal cation solution by placing the spongolite into a solution containing a metal cation at a concentration between 0.1-5% (w/w) metal cation for a period of time between 10 minutes and 1 week. In one embodiment, the spongolite is treated with a metal cation solution by placing the spongolite into a solution containing a metal cation at a concentration between 0.1-5% (w/w) metal cation for a period of time between 1-6 hours.

Metal cation treatment of the spongolite can be carried out using a range of concentrations from, for example, 0.1-5% (w/w) metal cation. In a preferred embodiment, the concentration of the metal sulphate solution is selected from the group consisting of: 0.1-4%, 0.1-3%, 0.1-2%, 0.1-1%, 0.2-5%, 0.3-5%, 0.4-5%, 0.5-5%, 0.6-5%, 0.7-5%, 0.8-5%, 0.9-5%, 1-5%, 2-5%, 3-5%, 4-5%. Preferably the soluble metal cation is metal cation of iron, copper, manganese, magnesium, aluminium, vanadium or calcium. More preferably the soluble metal cation is metal cation of iron, aluminium or copper.

In a preferred embodiment, the spongolite is treated with:
a 1-20% (w/w) metal salt solution for a period of time between:
5 minutes and 7 days;
10 minutes and 7 days;
10 minutes and 24 hours;
1 hour and 6 hours; or a 1-20% (w/w) metal salt solution for a period of time between:
10 minutes and 7 days;
10 minutes and 24 hours;
1 hour and 6 hours; or
a 1-20% (w/w) metal salt solution for a period of time between:
10 minutes and 7 days;
10 minutes and 24 hours;
1 hour and 6 hours.

Preferably the metal salt is a metal salt of iron, copper, manganese, magnesium, aluminium, vanadium or calcium. More preferably the soluble metal cation is metal salt of iron, aluminium, manganese or copper. Preferably the metal salt is a sulphate salt, carbonate salt or chloride salt. Preferably, the metal salt is iron sulphate, aluminium sulphate or copper sulphate.

In a preferred embodiment, the spongolite is treated with:
a 0.1-5% (w/w) metal cation solution fora period of time between:
10 minutes and 7 days;
10 minutes and 24 hours;
1 hour and 6 hours; or
a 0.1-5% (w/w) metal cation solution fora period of time between:
10 minutes and 7 days;
10 minutes and 24 hours;
1 hour and 6 hours; or
a 0.1-5% (w/w) metal cation solution fora period of time between:
10 minutes and 7 days;
10 minutes and 24 hours;
1 hour and 6 hours.

Preferably the soluble metal cation is metal cation of iron, copper, manganese, magnesium, aluminium, vanadium or calcium. More preferably the soluble metal cation is metal cation of iron, aluminium manganese or copper.

In one embodiment, after the spongolite has been treated with the soluble metal cation solution, the metal is present in the spongolite at a concentration selected from the range 10,000 mg/kg to 200,000 mg/kg of spongolite. For example, the metal may be present in the spongolite at a concentration selected from the group consisting of: 10,000 mg/kg, 15,000 mg/kg, 20,000 mg/kg, 25,000 mg/kg, 30,000 mg/kg, 35,000 mg/kg, 40,000 mg/kg, 45,000 mg/kg, 50,000 mg/kg, 55,000 mg/kg, 60,000 mg/kg, 65,000 mg/kg, 70,000 mg/kg, 75,000 mg/kg, 80,000 mg/kg, 85,000 mg/kg, 90,000 mg/kg, 95,000 mg/kg, 100,000 mg/kg, 110,000 mg/kg, 120,000 mg/kg, 130,000 mg/kg, 140,000 mg/kg, 150,000 mg/kg, 160,000 mg/kg, 170,000 mg/kg, 180,000 mg/kg, 190,000 mg/kg, 200,000 mg/kg, of spongolite. Preferably the soluble metal cation is metal cation of iron, copper, manganese, magnesium, aluminium, vanadium or calcium. More preferably the soluble metal cation is metal cation of iron, aluminium or copper.

In one embodiment, the spongolite is treated with the soluble metal cation after calcining. Preferably, the spongolite is treated with the soluble metal cation prior to calcining.

Therefore, there is provided a method for the sorption of phosphorous and/or nitrogen from a liquid, the method comprising contacting the liquid with a composition comprising spongolite wherein the spongolite is treated with a soluble metal cation and calcined prior to contacting the liquid.

If the soluble metal cation treatment is followed by calcining, the two-step process increases the ability of the treated spongolite to capture the anionic contaminants from the liquid compared to untreated spongolite, or spongolite treated with one of soluble metal cation treatment or calcining.

In a preferred embodiment, the spongolite is washed with water after extraction from the ground to remove remnants of clay, sand and other undesirable soil components. The washed spongolite may then be dried prior to treatment with a soluble metal cation solution. The treated spongolite may then be dried again after treatment with the soluble metal cation solution. The spongolite can be dried by any suitable drying means. In one example, the spongolite is placed at 30-40° C. for 1 hour to 7 days to dry the spongolite both after washing and after treatment with the soluble metal cation solution. The time taken to dry the spongolite will depend on the particle size. The soluble metal cation treated spongolite may be dried and then calcined as described above, or it may be calcined whilst still wet. Alternatively, the spongolite may be washed with water after extraction from the ground, dried at 30-40° C. for 1 hour to 7 days and then calcined without soluble metal cation treatment. In a further alternative, the soluble metal cation treatment and/or calcining may be carried out on spongolite that has been washed but not dried, i.e. spongolite that still contains residual washing water. Whilst the ordered process of calcining the spongolite after it has been treated with the soluble metal cation solution produces superior results, it will be understood that the invention can still achieve adequate results when the order is reversed. Thus the invention provides a spongolite that is first calcined and then treated with a soluble metal cation solution.

Therefore, the spongolite of the present invention may be used to remove phosphorous and/or nitrogen from a liquid:
after the spongolite is removed from the ground (optionally with washing to remove loose grit and sand);
after the spongolite is removed from the ground, treatment of the dry spongolite with a soluble metal cation solution and calcining after washing of the spongolite, drying the spongolite, treatment of the dried spongolite with a soluble metal cation solution and calcining;
after washing of the spongolite, drying the spongolite, treatment of the dried spongolite with a soluble metal cation solution drying the spongolite again, and calcining;
after washing of the spongolite and treatment with a soluble metal cation solution;
after washing of the spongolite and calcining;
after washing of the spongolite, calcining followed by treatment with a soluble metal cation solution; or
after washing of the spongolite, treatment with a soluble metal cation solution followed by calcining.

Contaminants and Pollutants

In use, the present invention is directed to removing dissolved contaminants, pollutants, impurities and other substances comprising phosphorous and/or nitrogen from liquids.

Phosphorus exist as different species, depending upon factors such as pH and other physico-chemical parameters. Phosphorus that can be removed from the liquid by means of the present invention is generally present in the liquid in soluble form, such as orthophosphate.

In use, the spongolite (natural, calcined and/or soluble metal cation treated) can be placed into the liquid (e.g. river, dam, effluent stream, etc.) for any length of time sufficient to for the phosphorous and/or nitrogen in the liquid to tightly bind with the metal cation. For example, the spongolite may be kept in the liquid for a period selected from: 1 hour to 1 year. In one embodiment, the spongolite can remain in the liquid indefinitely.

Preferably, the spongolite is placed into the liquid in a manner which allows for the spongolite to be easily retrieved, such as by placing particles of the spongolite into a bag made from netting. The bag containing the spongolite can then be placed into the liquid in any suitable formation which allows, for example, the liquid to flow through the netting and into the spongolite. One suitable formation, for use when the liquid is a river, is a weir formation across a river, whereby multiple bags of spongolite are placed side by side across the flow of water. As the liquid in the form of contaminated river water flows through the bags and into the spongolite, the phosphorous and/or nitrogen in the liquid is captured by the metal cations in the spongolite. It will be understood that this weir formation is just one non-limiting example and that the spongolite can be placed into the liquid in any suitable arrangement, depending on the size, shape and location of the liquid, and an appropriate formation for each situation could be easily developed by the relevant person skilled in the art.

In examples where the liquid is not flowing (such as a pool or dam), the spongolite may be moved from time to time, or continuously, to different locations within the liquid to ensure that the spongolite is exposed to as much contaminated liquid as possible. Where necessary, the spongolite can be moved through the liquid by any suitable means, such as by hand, or by automated machine. Alternatively, the liquid from the non-flowing source may be pumped through the spongolite.

Phosphate Retention Index (PRI)

The phosphorous retention index (PRI) is an index to describe phosphorous (P) binding in the form of phosphate ($PO_4^{3-}$) of Australian soils. According to the *Chem-Centre Method* (Allen, D. G. and Jeffery, R. C.; (1990) "Methods for Analysis of Phosphorous in Western Australian Soils"; Chemistry Centre, 125 Hay Street West Perth, WA Australia), a dry soil sample (in this case spongolite sample) and a so-called equilibration solution with a known phosphorous concentration (10 µg/ml) are added to a test vessel and tumbled for 16 hours. By analysing the phosphorous concentration of the supernatant solution after 16 hours, the amount of phosphorous sorbed to the soil (spongolite) can be determined. The calculated PRI is an index to describe phosphorous sorption by the soil. Generally, higher PRIs represent higher phosphorous sorption.

However, the PRI does not proportionally represent phosphorous sorption, especially at a very high PRI e.g. doubling the PRI does not equal doubling in phosphorous sorption. Therefore, an additional comparison is also used. This can be calculated from the same method used above: the percentage of phosphorous sorbed by the spongolite in relation to phosphorous present in the equilibration solution at the beginning of the test. The percentage of phosphorous sorbed is a linear correlation and enables direct comparison of results.

Phosphorous is found in soil in different forms including in the form of phosphate ions ($PO_4^{3-}$). These free phosphate ions adsorb onto soil via several mechanisms, some of which involve chemical reactions with cations of iron, copper, manganese, magnesium, aluminium, vanadium or calcium. The reactions with metal cations are pH dependent. At very low pH (<1.3), the main sorption mechanism is the reaction of phosphate ions with iron. Within the pH range of 1.3-4.3, the phosphate ions mainly create a complex with aluminium. At higher pH values (4.3-7.2), the phosphate ions are commonly in the form of hydrolysed phosphate ions. When the solution reaches pH values of 7.2 and higher, the phosphate ions form complexes with calcium and magnesium (Rayment and Lyons, Soil Chemical Methods: Australasia, CSIRO Publishing, 2011).

Naturally occurring spongolite has a PRI of between about 10-50, or about 19-28.

Preferably, the spongolite is treated with a metal solution such as a soluble metal cation solution. In this embodiment, preferably the treated spongolite has a PRI between 10 and 5,000. The composition comprising treated spongolite may have a PRI selected from the group consisting of greater than or equal to: 10, 20, 30, 40, 50, 60, 70, 80, 90, 100, 200, 300, 400, 500, 600, 700, 800, 900, 1,000, 1,500, 2,000, 2,500, 3,000, 3,500, 4,000, 4,500 and 5,000. It may be between 100-600, 100-500, 200-600, 200-500, 200-400. The composition comprising treated spongolite may have a PRI between 10 and 500.

Preferably, the spongolite is calcined. In this embodiment, preferably the calcined spongolite has a PRI between 100-5000. The composition comprising calcined spongolite may have a PRI selected from the group consisting of greater than or equal to: 100, 200, 300, 400, 500, 600, 700, 800, 900, 1,000, 1,500, 2,000, 2,500, 3,000, 3,500, 4,000, 4,500 and 5,000. It may be between 100-600, 100-500, 200-600, 200-500, 200-400. The composition comprising treated spongolite may have a PRI between 50 and 500.

Preferably, the spongolite is treated with a soluble metal cation solution and then calcined. In this embodiment, preferably the treated and calcined spongolite has a PRI between 500-5000. Preferably the composition comprising spongolite has a PRI selected from the group consisting of greater than or equal to: 500, 600, 700, 800, 900, 1,000, 1,500, 2,000, 2,500, 3,000, 3,500, 4,000, 4,500 and 5,000. It may be between 500-1,000, 600-1,500, 600-3,000. The composition comprising treated and calcined spongolite may have a PRI between 1,000 and 5,000.

Nitrogen Retention Capability

The nitrogen retention capability is calculated similarly to the PRI. The nitrogen retention capability can be described as an index (NRI). The test procedure and calculation of results for the NRI is consistent with the described PRI test above. As a source of nitrate, nitric acid, potassium nitrate and ammonium nitrate were used. Test procedure as per PRI. Analysis of nitrate via nitrate-N Palintest (colorimetric assay). The results are given for nitrogen in the form of nitrate Preferably, the spongolite is treated with a metal solution such as a soluble metal cation solution. In this embodiment, preferably the treated spongolite has a Nitrogen Retention capability between 1 and 5,000. The composition comprising treated spongolite may have a Nitrogen Retention capability selected from the group consisting of greater than or equal to: 1, 5, 10, 10, 20, 30, 40, 50, 60, 70, 80, 90, 100, 200, 300, 400, 500, 600, 700, 800, 900, 1,000, 1,500, 2,000, 2,500, 3,000, 3,500, 4,000, 4,500 and 5,000. It may be between 100-600, 100-500, 200-600, 200-500, 200-400. The composition comprising treated spongolite may have a Nitrogen Retention capability between 1 and 500.

Preferably, the spongolite is calcined. In this embodiment, preferably the calcined spongolite has a Nitrogen Retention capability between 100-5000. The composition comprising calcined spongolite may have a Nitrogen Retention capability selected from the group consisting of greater than or equal to: 1, 5, 10, 10, 20, 30, 40, 50, 60, 70, 80, 90, 100, 200, 300, 400, 500, 600, 700, 800, 900, 1,000, 1,500, 2,000, 2,500, 3,000, 3,500, 4,000, 4,500 and 5,000. It may be between 100-600, 100-500, 200-600, 200-500, 200-400. The composition comprising treated spongolite may have a Nitrogen Retention capability between 1 and 500.

Preferably, the spongolite is treated with a soluble metal cation solution and then calcined. In this embodiment, preferably the treated and calcined spongolite has a Nitrogen Retention capability between 1 and 5,000. Preferably the composition comprising spongolite has a Nitrogen Retention capability selected from the group consisting of greater than or equal to: 1, 5, 10, 10, 20, 30, 40, 50, 60, 70, 80, 90, 100, 200, 300, 400, 500. It may be between 1-500, 1-400, 1-300, 1-250.

pH

Without being held to any theory, we believe that the pH of the spongolite affects its ability to bind phosphate. It has been found that if the spongolite is in a solution at a high pH (above pH 8), this causes a reduction in binding of phosphate, and lower PRI.

Therefore, the pH of the liquid being treated can affect the ability of the spongolite to bind phosphate. It is preferable that the liquid being treated is of a pH between 0.1 and 8, more preferably between 0.1 and 7, most preferably between about 4 and 7.

However, the effect of pH also makes it possible to re-use the spongolite after it has been used to decontaminate a liquid, by manipulating the pH to remove bound phosphate from the contaminated liquid. After using a sample of spongolite to treat a contaminated liquid, the phosphate-laden spongolite can be exposed to a high pH solution (preferably pH above at least 7). This will reduce the ability of the spongolite to bind phosphate and the already bound phosphate will desorb. Once this spongolite is washed to remove the high pH desorbing solution and free phosphate, it can then be dried and re-used to treat another sample of contaminated liquid.

Prewashing of Spongolite

In a preferred embodiment, the spongolite is washed with water after extraction from the ground to remove remnants of clay, sand and other undesirable soil components and then dried by placing at 30-40° C. for 1 hour to 1 week.

After drying, the spongolite is treated with a 1-20% (w/w) metal salt solution (or 0.1-5% (w/w) metal cation solution) for between 10 minutes and 7 days and then calcined by placing at a temperature between 400° C. and 800° C. for a period of time of between 30 minutes and 7 days.

Composition

The present invention provides a composition for the sorption of phosphorous and/or nitrogen, comprising spongolite.

Preferably the liquid is water or an aqueous solution.

Preferably the phosphorous removed from the liquid is in the form of phosphate and/or the nitrogen removed from the liquid is in the form of nitrate or nitrite.

The invention further provides a composition for the sorption of phosphorous and/or nitrogen, comprising calcined spongolite.

Preferably the calcining process occurs:
a) at a temperature selected from any temperature within the range of 400° C. to 800° C.; and/or
b) for a period of time of between 30 minutes and 7 days.

The invention further provides a composition for the sorption of phosphorous and/or nitrogen, comprising soluble metal cation treated spongolite.

The invention further provides a composition for the sorption of phosphorous and/or nitrogen, comprising calcined and soluble metal cation treated spongolite.

Preferably the soluble metal cation is metal cation of iron, copper, manganese, magnesium, aluminium, vanadium or calcium. More preferably the soluble metal cation is metal cation of iron, aluminium manganese or copper. Preferably the soluble metal cation is provided in the form of a metal salt. Preferably the metal salt is a sulphate salt, carbonate salt or chloride salt. Preferably, the metal salt is iron sulphate or copper sulphate.

Preferably the soluble metal cation treatment is carried out:
a) using a metal salt at a concentration of between 1-20% (w/w) metal salt;
b) using a metal cation at a concentration of between 0.1-5% (w/w) metal cation; and/or
c) for a period of time between 10 minutes and 7 days.

The spongolite may be treated with the soluble metal cation and then calcined, or may be calcined and then soluble metal cation treated.

The present invention provides a composition comprising calcined spongolite.

The present invention provides a composition comprising soluble metal cation treated spongolite.

The present invention provides a composition comprising calcined and soluble metal cation treated spongolite.

The present invention provides a composition comprising calcined spongolite when used in the sorption of phosphorous and/or nitrogen from a liquid.

The present invention provides a composition comprising soluble metal cation treated spongolite when used in the sorption of phosphorous and/or nitrogen from a liquid.

The present invention provides a composition comprising calcined and soluble metal cation treated spongolite when used in the sorption of phosphorous and/or nitrogen from a liquid.

Kits

The present invention provides a kit for the sorption of phosphorous and/or nitrogen from a liquid, the kit comprising:
a) a composition comprising spongolite;
b) instructions for use.

Preferably the liquid is water or an aqueous solution.

Preferably the phosphorous removed from the liquid is in the form of phosphate and/or the nitrogen removed from the liquid is in the form of nitrate or nitrite.

The present invention provides a kit for the sorption of phosphorous and/or nitrogen from a liquid, the kit comprising:
a) a composition comprising calcined spongolite;
b) instructions for use.

Preferably the calcining process occurs:
a) at a temperature selected from any temperature within the range of 400° C. to 800° C.; and/or
b) for a period of time of between 30 minutes and 7 days.

The present invention provides a kit for the sorption of phosphorous and/or nitrogen from a liquid, the kit comprising:
a) a composition comprising soluble metal cation treated spongolite;
b) instructions for use.

Preferably the soluble metal cation is metal cation of iron, copper, manganese, magnesium, aluminium, vanadium or calcium. More preferably the soluble metal cation is metal cation of iron, aluminium or copper. Preferably the soluble metal cation is provided in the form of a metal salt. Preferably the metal salt is a sulphate salt, carbonate salt or chloride salt. Preferably, the metal salt is iron sulphate, aluminium sulphate or copper sulphate.

Preferably the soluble metal cation treatment is carried out:
a) using a metal salt at a concentration of between 1-20% (w/w) metal salt;
b) using a metal cation at a concentration of between 0.1-5% (w/w) metal cation; and/or
c) for a period of time between 10 minutes and 7 days.

The present invention provides a kit for the sorption of phosphorous and/or nitrogen from a liquid, the kit comprising:
a) a composition comprising calcined and soluble metal cation treated spongolite;
b) instructions for use.

The spongolite may be treated with the soluble metal cation and then calcined, or may be calcined and then soluble metal cation treated.

General

Those skilled in the art will appreciate that the invention described herein is susceptible to variations and modifications other than those specifically described. The invention includes all such variation and modifications. The invention also includes all of the steps, features, formulations and compounds referred to or indicated in the specification, individually or collectively and any and all combinations or any two or more of the steps or features.

Each document, reference, patent application or patent cited in this text is expressly incorporated herein in their entirety by reference, which means that it should be read and considered by the reader as part of this text. That the document, reference, patent application or patent cited in this text is not repeated in this text is merely for reasons of conciseness.

Any manufacturer's instructions, descriptions, product specifications, and product sheets for any products mentioned herein or in any document incorporated by reference herein, are hereby incorporated herein by reference, and may be employed in the practice of the invention.

The present invention is not to be limited in scope by any of the specific embodiments described herein. These embodiments are intended for the purpose of exemplification only. Functionally equivalent products, formulations and methods are clearly within the scope of the invention as described herein.

The invention described herein may include one or more range of values (e.g. size, concentration etc.). A range of values will be understood to include all values within the range, including the values defining the range, and values adjacent to the range which lead to the same or substantially the same outcome as the values immediately adjacent to that value which defines the boundary to the range. For example, a person skilled in the field will understand that a 10% variation in upper or lower limits of a range can be totally appropriate and is encompassed by the invention. More particularly, the variation in upper or lower limits of a range will be 5% or as is commonly recognised in the art, whichever is greater.

In this application, the use of the singular also includes the plural unless specifically stated otherwise. In this application, the use of "or" means "and/or" unless stated otherwise. Furthermore, the use of the term "including", as well as other forms, such as "includes" and "included", is not limiting. Also, terms such as "element" or "component" encompass both elements and components comprising one unit and elements and components that comprise more than one subunit unless specifically stated otherwise. Also, the use of the term "portion" can include part of a moiety or the entire moiety.

Throughout this specification, unless the context requires otherwise, the word "comprise" or variations such as "comprises" or "comprising", will be understood to imply the inclusion of a stated integer or group of integers but not the exclusion of any other integer or group of integers.

Other definitions for selected terms used herein may be found within the detailed description of the invention and apply throughout. Unless otherwise defined, all other scientific and technical terms used herein have the same meaning as commonly understood to one of ordinary skill in the art to which the invention belongs.

The following Examples are to be construed as merely illustrative and not limitative of the remainder of the disclosure in any way whatsoever. These Examples are included solely for the purposes of exemplifying the present invention. They should not be understood as a restriction on the broad summary, disclosure or description of the invention as set out above. Without further elaboration, it is believed that one skilled in the art can, using the preceding description, utilize the present invention to its fullest extent. In the foregoing and in the following examples, all temperatures are set forth uncorrected in degrees Celsius; and, unless otherwise indicated, all parts and percentages are by weight.

EXAMPLES

Example 1: Phosphorous Sorption Assay

Phosphorous Retention Index (PRI)

The PRI is an index to describe phosphorous binding in the form of phosphate ($PO_4^{3-}$) of Australian soils. According to the *Chem-Centre Method* (Allen, D. G. and Jeffery, R. C.; (1990) "Methods for Analysis of Phosphorous in Western Australian Soils"; Chemistry Centre, 125 Hay Street West Perth, WA Australia), a dry soil sample (in this case a spongolite sample) and the equilibration solution of a known phosphorous concentration (10 μg/ml), are added to a test vessel and tumbled for 16 hours. The phosphorous concentration of the solution is analysed after 16 hours and the amount of phosphorous sorption measured by comparing the final concentration of the phosphorous in the supernatant solution with the initial concentration. The calculated PRI is an index to describe phosphorous sorption by the soil.

This phosphorous sorption assay described below was determined using the guidelines for Phosphate Retention Index (PRI) procedures as discussed above.

More specifically, 2 g of spongolite sample was added to 40 ml of 10 μg/ml phosphorous equilibration solution and added to the test vessel. The spongolite sample and phosphate solution were then tumbled for 16 hours. The sample was then centrifuged for 20 min at 4500 rpm in an Eppendorf Centrifuge 5430.

The supernatant was removed and the phosphorous concentration in the supernatant was measured via colorimetry as described above to determine the PRI. All PRI testing was performed in triplicate.

FIG. 1 shows the relation between phosphorous concentration remaining in the supernatant after tumbling the sample in the equilibration solution [x-axis—labelled "P equilibrium"], and the PRI [y-axis] (Allen, D. G. and Jeffery, R. C.; (1990) "Methods for Analysis of Phosphorous in Western Australian Soils"; Chemistry Centre, 125 Hay Street West Perth, WA Australia). FIG. 1 shows that at low supernatant concentrations the PRI increases rapidly and may falsely indicate a significant increase in phosphorous sorption, and that for soil with high P sorption, the PRI is not proportional. In general, higher PRIs represent higher phosphorous sorption. However, the results show that the PRI does not necessarily proportionally represent phosphorous sorption, especially at a very high PRI e.g. doubling the PRI did not equate to a doubling in phosphorous sorption. This is the reason for using the percentage of P sorbed as described below.

Therefore, an additional comparison was calculated from the test results. More specifically, the percentage of phosphorous sorption by the spongolite determined by comparing the amount of phosphorous in the initial equilibration solution to the amount of phosphorous in the final supernatant solution to calculate a percentage phosphorous sorbed.

Figure 2:
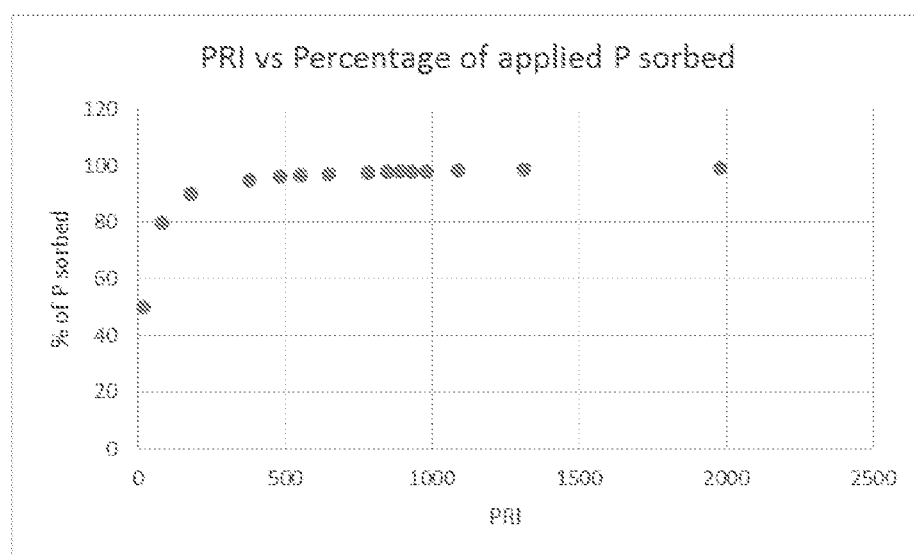
FIG. 2 is a graph showing the relationship between PRI and percentage of P sorbed during the test.

The percentage of phosphorous sorption is a linear correlation and enables direct comparison of the results. FIG. 2 shows the correlation between the PRI and the percentage of phosphorous sorption. FIG. 2 also identifies that the PRI does not proportionally represent phosphorous sorption. A PRI of 500 equals a phosphorous sorption of 96%, whereas doubling the PRI to 1000 only increases the sorption percentage to 98%. This indicates that PRIs over 500 only exhibit an increase in phosphorous sorption of up to 4% even though the PRI might have a value of 3000 or more. Hence, the PRI is not necessarily a suitable test for comparing different treatments of spongolite as the PRI may falsely indicate a significant increase in phosphorous sorption capacity.

Example 2: Spongolite Phosphorous Sorption Assay (Ferrous Treated and Calcined Versus Calcined)

Group A—Calcined Spongolite (Control)

A first batch of mined spongolite was rinsed with water to remove any clay (washed spongolite) and dried at 40° C. until completely dry (around 24 hours). The washed and dried spongolite was divided into 9 groups (Samples A1-A9) and heated in a muffled furnace (calcining). Each group was heated at a different temperature for thirty minutes as indicated by the following: 400° C. (sample A1), 450° C. (sample A2), 500° C. (sample A3), 550° C. (sample A4), 600° C. (sample A5), 650° C. (sample A6), 700° C. (sample A7), 750° C. (sample A8), 800° C. (sample A9). Due to the relatively slow heating and cooling of a muffle furnace, samples were typically exposed to elevated temperatures for about 2 hours.

Group B—Calcined Iron Sulphate Treated Spongolite

A second batch of the mined spongolite was rinsed with water to remove any clay (washed spongolite), treated with a 10% (w/w) ferrous sulphate solution for 2 hours and dried at 40° C. for around 24 hours. The dried spongolite was divided into 9 groups (samples B1-B9) and heated in a muffled furnace (calcining). Each group was heated at a different temperature for thirty minutes as indicated by the following: 400° C. (sample B1), 450° C. (sample B2), 500° C. (sample B3), 550° C. (sample B4), 600° C. (sample B5), 650° C. (sample B6), 700° C. (sample B7), 750° C. (sample B8), 800° C. (sample B9). Due to the relatively slow heating and cooling of a muffle furnace, samples were typically exposed to elevated temperatures for about 2 hours.

Group A and Group B were then subjected to the phosphorous sorption assay as described in Example 1 to determine the PRI. The results are presented in Table 1 and FIG. 3.

Figure 3:
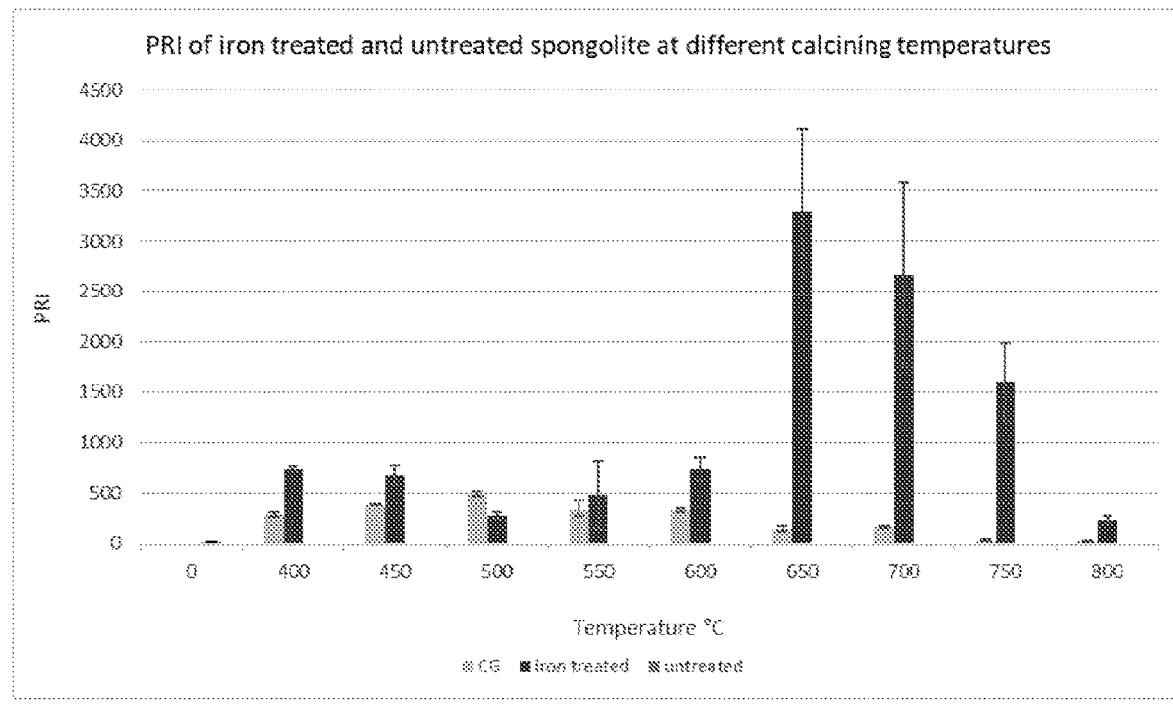
FIG. 3 is a bar graph showing the PRI results from Test 1 —Spongolite Phosphorous Adsorption Assay (Ferrous-treated versus Non-ferrous-treated) as described in Example 2. Results show the mean of three replicates, with error bars showing standard deviation.

As shown in Table 1 and FIG. 3 the spongolite treated with ferrous sulphate and calcined (Group B) showed a significantly higher PRI than the control group that was only calcined (Group A), especially for temperatures 600° C. and greater (samples B5-B8). Untreated spongolite (non-ferrous treated and non-calcined) showed a PRI of 26. In contrast, the control group that was only calcined (Group A) demonstrated a twenty-fold increase in PRI to 494 at 500° C. (A3). The PRI of the ferrous sulphate-treated and calcined spongolite (Group B) reached up to 3,286 at 650° C. (B6). At higher temperatures, the beneficial effect of temperature appears reduced. These results indicate an optimum temperature between 600° C. and 750° C. for a ferrous sulphate treated and calcined spongolite sample.

The ferrous sulphate plus calcining treatment demonstrated a great impact on phosphate adsorption of spongolite, exceeding the PRI of untreated spongolite and calcined spongolite by multiple times.

Figure 4:
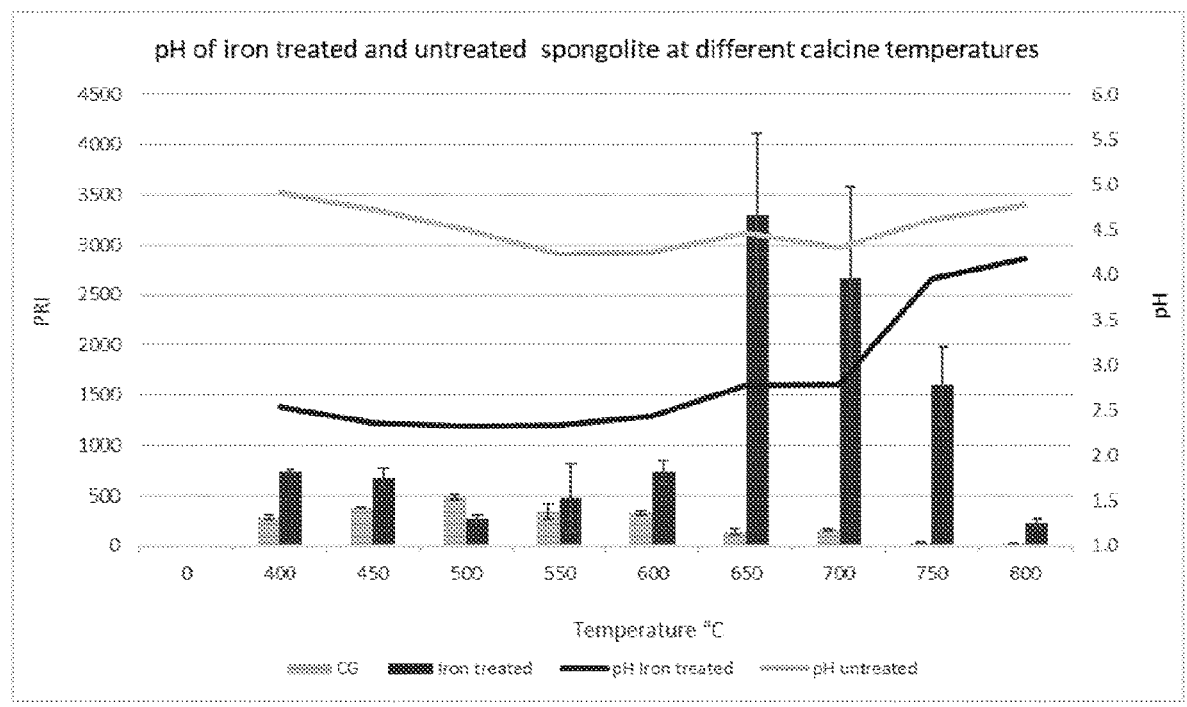
FIG. 4 is a graph showing the pH of spongolite from Test 1 as described in Example 2.

However, the ferrous sulphate treatment plus calcining reduced the pH of the spongolite as shown in FIG. 4. After calcining and placing in a phosphorous-containing equilibration solution of a known phosphorous concentration (10 mg/L) for 16 h, the pH of the solution surrounding the spongolite samples was tested. The ferrous sulphate treated and calcined spongolite (Group B) had a pH of between 2.3 and 2.8 for temperatures between 400° C. and 700° C. For the same temperature range, the pH of the equilibration solution surrounding the control group calcined spongolite (Group A) was between 4.2 and 4.9, which is on average 2 pH units higher. There did not seem to be a correlation between fluctuations of pH and PRI values.

After 16 hours of tumbling for PRI testing, the pH of the supernatant solution was again tested. The relative pH's were similar to those before PRI testing. The supernatant solutions of the ferrous sulphate treated and calcined spongolite (Group B) were generally slightly more acidic than the spongolite samples of the calcined control Group A.

Example 3: Spongolite Phosphorous Sorption Assay (5% v 15% Ferrous Treated)

To further investigate the impact of calcining temperature and ferrous sulphate on PRI and pH, a sample of washed and dried spongolite was treated with a 5% or 15% ferrous sulphate solution. As in Example 2, the samples were soaked in the ferrous sulphate solution for 2 hours and then calcined. The samples were then compared against each other and a calcined spongolite control group, according to the phosphorous assay described in Example 1. For each temperature, three samples were prepared: one calcined control group (Group C); one group treated with a 5% ferrous sulphate solution and then calcined (Group D) and one group treated with a 15% ferrous sulphate solution and then calcined (Group E).

Figure 5A:
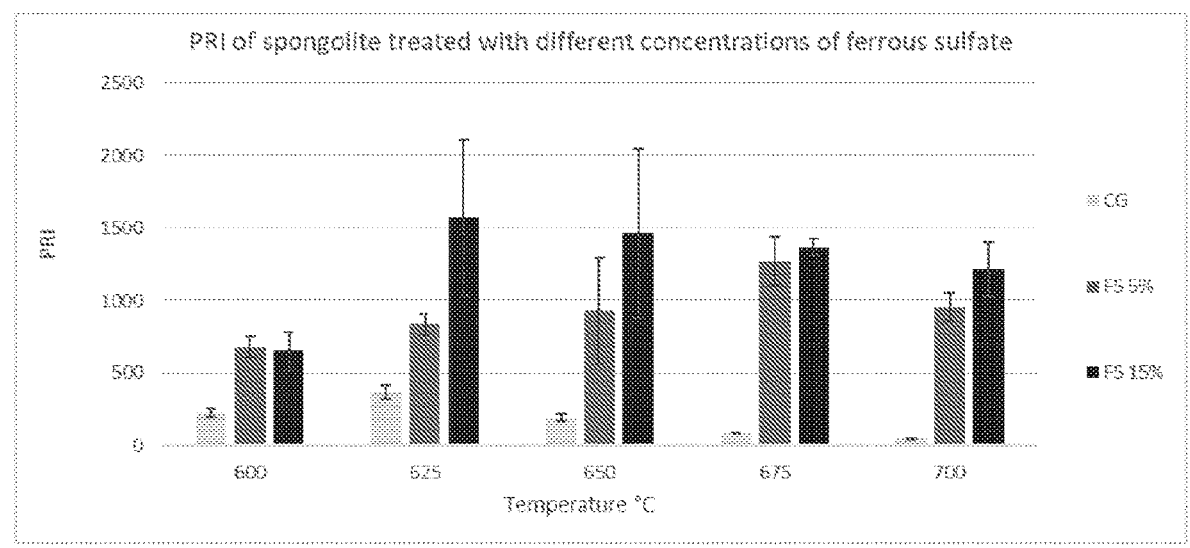
FIG. 5a is a graph showing the PRI results from Test 2—Spongolite Phosphorous Adsorption Assay (5% v's 15% Ferrous-treated) as described in Example 3.

Since the optimum temperature was expected between 600° C. and 700° C., the spongolite samples were heated for 30 minutes under the following temperatures: 600° C. (samples C1, D1 and E1), 625° C. (samples C2, D2 and E2), 650° C. (samples C3, D3 and E3), 675° C. (samples C4, D4 and E4) and 700° C. (samples C5, D5 and E5). PRI was determined as described above. The results are presented in Table 1 and FIGS. 5a and 5b. FIG. 5a gives the results as the PRI and FIG. 5b in percentage of phosphorous sorbed. This comparison also shows that PRI are not useful in high values because of the higher variations and standard deviation compared to % P sorbed.

The two groups that were treated with ferrous sulphate and then calcined showed significantly higher PRIs than the control calcined group. The 15% ferrous sulphate treated and calcined (Group E) had the highest PRI of 1576 at 625° C. (sample E2), whereas the 5% ferrous sulphate treated and calcined group showed the highest PRI of 1278 at 675° C.

Figure 5B:
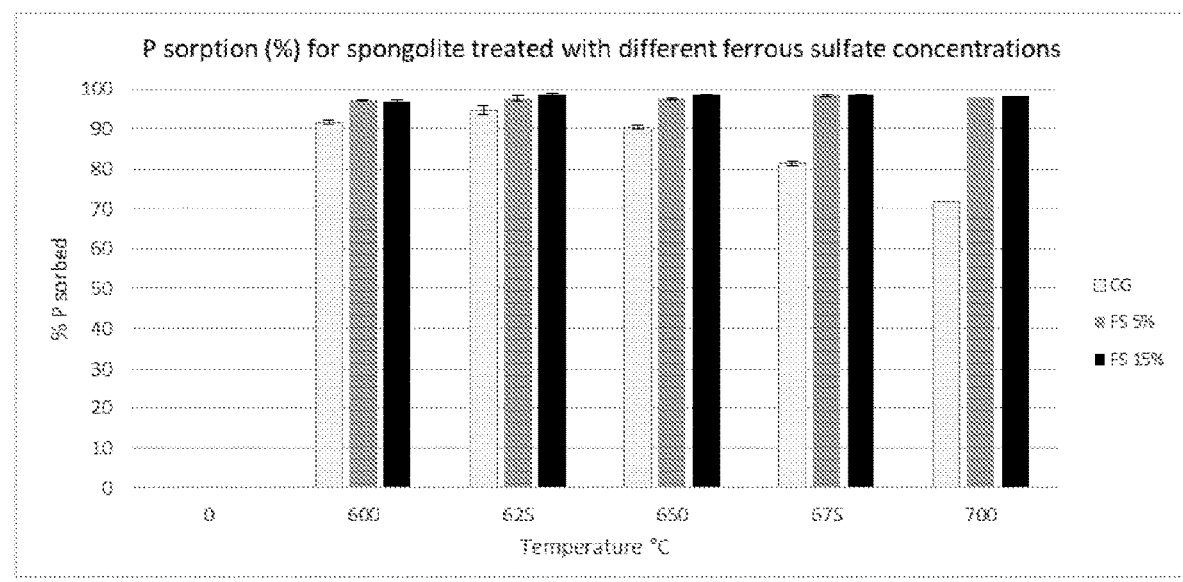
FIG. 5b is a graph showing the P sorption results in percent (%) from Test 2—Spongolite Phosphorous Adsorption Assay (5% v's 15% Ferrous-treated) as described in Example 3.
Figure 6:
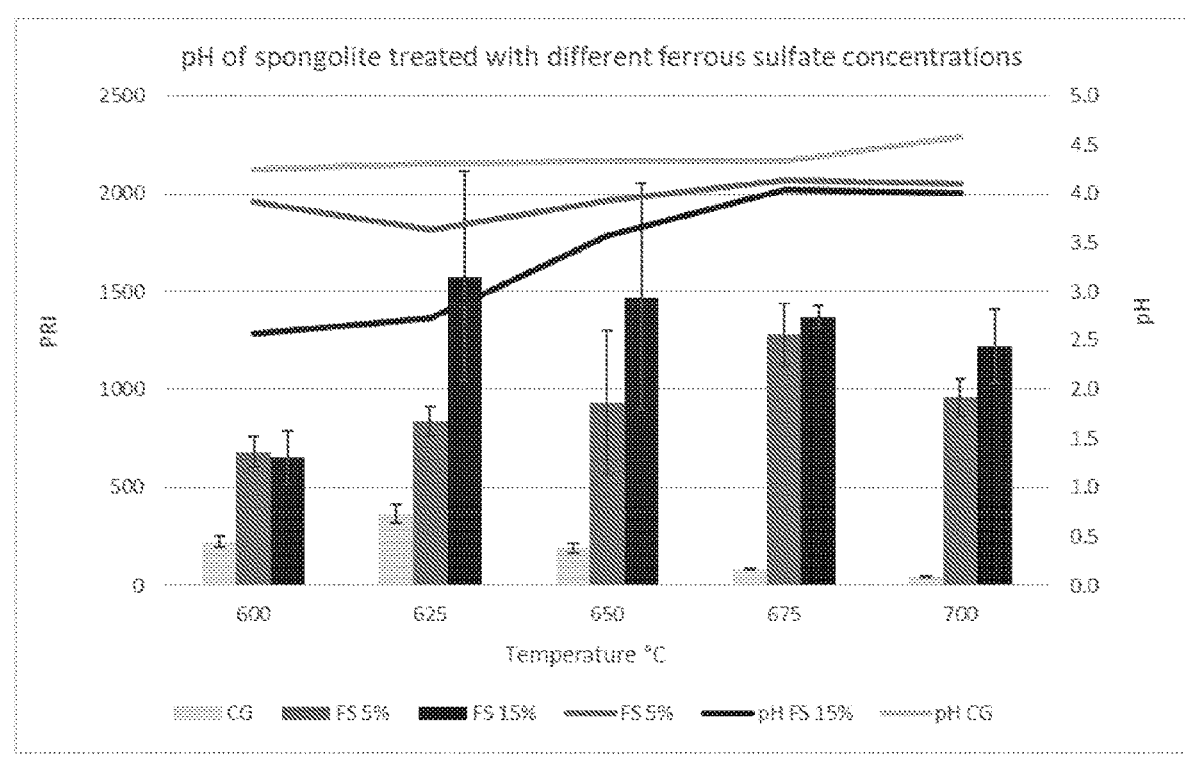
FIG. 6 is a graph showing the pH of Spongolite from Test 2 as described in Example 3.

(sample D4). FIG. 5b shows that the difference in percentage of phosphorous sorbed between the three groups is very low for certain temperatures which also means that to reach these extra few percent of phosphorous sorption a lot of effort is necessary. Since the 15% treated ferrous sulphate treated and calcined spongolite still had a high PRI at 675° C. (sample E4) and the standard variation for both samples was lowest, 675° C. was selected as the optimal temperature. This is confirmed by the pH of the spongolite as shown in FIG. 6.

The two ferrous sulphate treated and calcined groups showed low pH values at 625° C., but at 675° C. the pH for both is around 4 which is slightly lower than the pH of 4.3 of the control calcined group.

Figure 7:
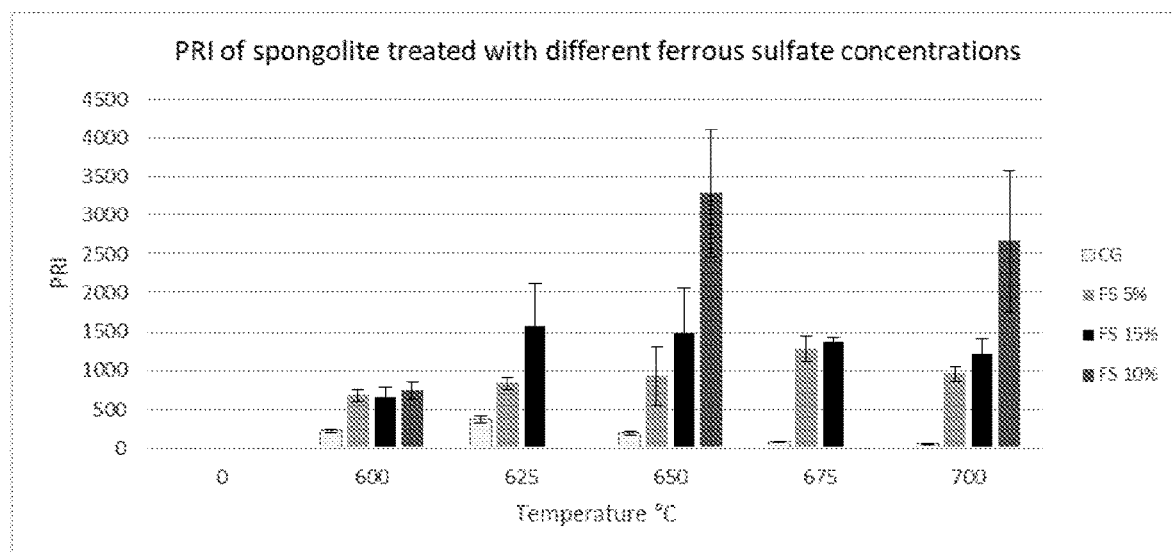
FIG. 7 is a graph comparing the results of Test 1 and 2.

FIG. 7 shows a comparison of Example 2 and 3. In Example 2 the 10% ferrous sulphate treated and calcined spongolite showed the highest PRI at 650° C. (sample B6), but 675° C. was not tested in Example 2. The PRI of the 10% ferrous sulphate treated and calcined spongolite reached PRIs of up to 3286 (sample B6), whereas the highest PRI of the 5% and 15% ferrous sulphate treated and calcined spongolite was 1278 (sample D4) and 1576 (sample E2), respectively. Even though PRIs of the 10% ferrous sulphate solution are higher than those of the 5% and 15% ferrous sulphate treated and calcined spongolite, it is anticipated that a higher % ferrous sulphate solution for treatment of spongolite will increase phosphorous sorption. Other influences (ambient temperature, pH, etc.) might have led to varying results. The pH of the 10% treated spongolite at 650 and 700° C. is around 2.7 whereas it is around 4 for the 5 and 15% treated spongolite. The pH has a great influence on phosphorous sorption.

Example 4: Phosphorous Sorption Assay at High Phosphorous Concentration

Figure 8A:
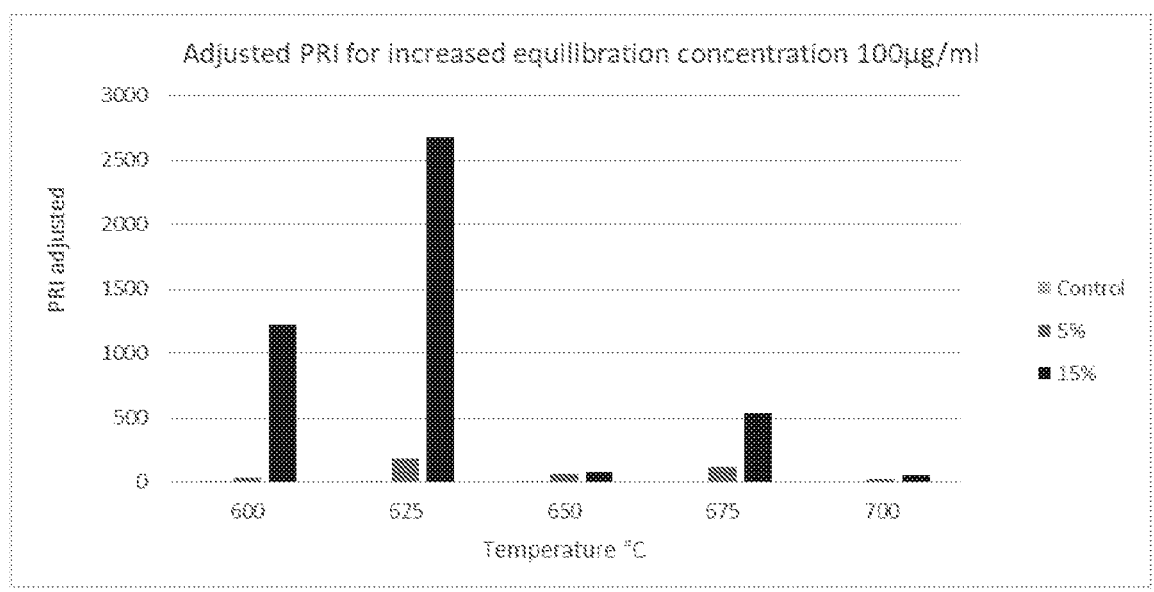
FIG. 8a is a graph showing the PRI results of spongolite with increased phosphorous equilibration solution from Test 3 —Phosphorous Adsorption Assay at High PRI's as described in Example 4.

The test method described above in Example 1 was adapted to review phosphorous adsorption at high phosphorous concentration. Tests were conducted with a phosphorous equilibration solution containing a greater amount of phosphorous, being 100 µg/ml. Results are shown in Table 1, Table 2 and FIG. 8a and FIG. 8b.

The PRI of the 15% ferrous sulphate treated and calcined spongolite (Group H, samples H1-H5) is nearly two times higher than at the previous tests when a lower equilibration concentration of phosphorous (Example 3-10 µg/ml) were used. The PRI results for the 5% ferrous sulphate treated and calcined group (Group G, samples G1-G5) and control calcined only group was lower than the previous tests. At a higher P equilibration concentration such as 100 µg/ml, PRIs are expected to be lower compared to a lower P equilibration concentration. The increase in PRI for group H samples indicate that the potential of P sorption was not fully exhausted.

The PRI represents a ratio of the amount of phosphate sorbed relative to the amount of phosphate left in the supernatant solution. The same PRI at different phosphorous equilibration concentrations (10 µg/ml and 100 µg/ml) means the same ratio of sorption, not the same total amount of phosphorous sorbed. Therefore, PRIs determined with the given method should be used as indicative PRIs. However, the phosphorous sorption capacity of spongolite is large, especially of ferrous sulphate treated and calcined spongolite. The remaining phosphorous concentration in the supernatant of the sample containing 15% ferrous sulphate treated and calcined spongolite (sample H2) was 0.74 µg/ml of the start solution of 100 µg/ml, meaning that around 99% of all phosphate in solution was sorbed.

Figure 8B:
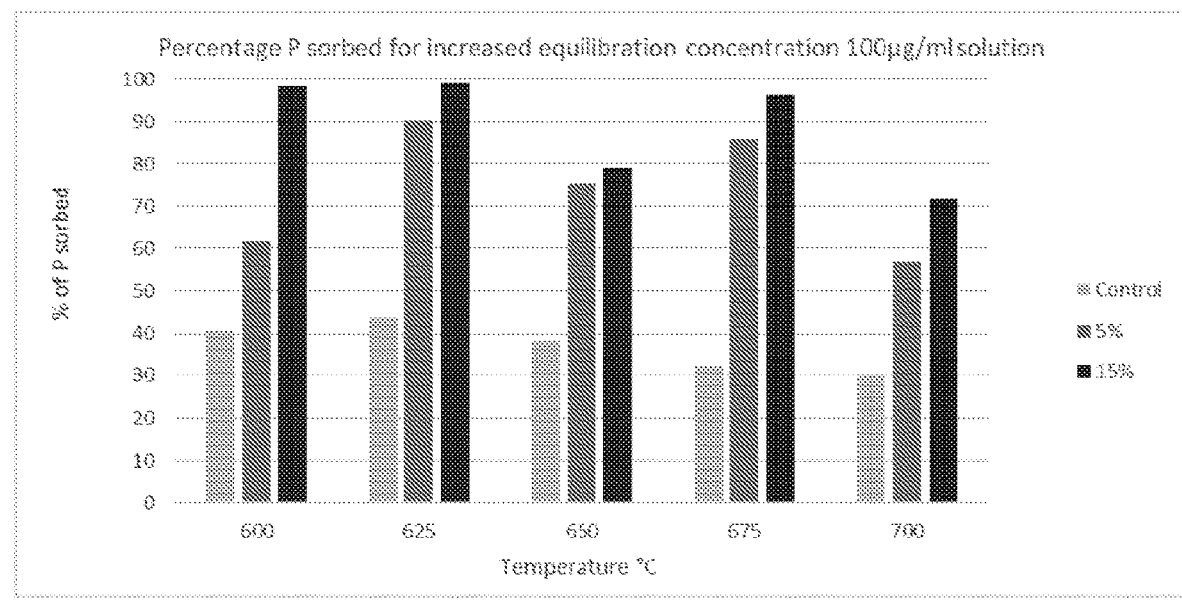
FIG. 8b is a graph showing the results of P sorption in percentage of applied P of spongolite with increased phosphorous equilibration solution from Test 3 —Phosphorous Adsorption Assay at High PRI's as described in Example 4.

To compare test results of 10 µg/ml and 100 µg/ml equilibration concentrations, FIGS. 5b and 8b show the % phosphorous sorbed during Example 3 and 4. Table 1 further shows the weight of phosphorous sorbed in mg per g spongolite for Example 3 and 4. By equilibrating spongolite with a 10 µg/ml solution, the maximum possible phosphorous uptake per g of spongolite is 0.2 mg (Example 3). For example sample E5 has a PRI of 1221 and has sorbed 0.197 mg P per g spongolite. By adjusting the PRI equation to the higher concentration of 100 µg/ml sample H1 happened to have a similar PRI (1223) to sample E5, however, the amount of sorbed phosphorous is ten-fold higher for sample H1 (1.968 mg/g). This example shows that not only the PRI should be used as a mean of comparison and it also shows that spongolite has a great potential for phosphorous sorption even at increasing phosphorous concentrations. This is further described in Examples 7-9.

TABLE 1

Weight of phosphorous sorbed in mg per g spongolite.

| Sample Code | Treatment | Calcining Temperature ° C. | P input per test in mg | P sorbed per 1 g spongolite mg/g | PRI |
|---|---|---|---|---|---|
| Example 3 - 10 µg/ml | | | | | |
| C1 | calcine | 600 | 0.4 | 0.183 | 224 |
| C2 | calcine | 625 | 0.4 | 0.190 | 367 |
| C3 | calcine | 650 | 0.4 | 0.181 | 190 |
| C4 | calcine | 675 | 0.4 | 0.163 | 87 |
| C5 | calcine | 700 | 0.4 | 0.144 | 51 |
| D1 | 5% ferrous sulphate, calcine | 600 | 0.4 | 0.194 | 680 |
| D2 | 5% ferrous sulphate, calcine | 625 | 0.4 | 0.195 | 837 |
| D3 | 5% ferrous sulphate, calcine | 650 | 0.4 | 0.195 | 930 |
| D4 | 5% ferrous sulphate, calcine | 675 | 0.4 | 0.197 | 1278 |
| D5 | 5% ferrous sulphate, calcine | 700 | 0.4 | 0.196 | 959 |
| E1 | 15% ferrous sulphate, calcine | 600 | 0.4 | 0.194 | 653 |
| E2 | 15% ferrous sulphate, calcine | 625 | 0.4 | 0.197 | 1576 |
| E3 | 15% ferrous sulphate, calcine | 650 | 0.4 | 0.197 | 1471 |
| E4 | 15% ferrous sulphate, calcine | 675 | 0.4 | 0.197 | 1367 |
| E5 | 15% ferrous sulphate, calcine | 700 | 0.4 | 0.197 | 1221 |

TABLE 1-continued

Weight of phosphorous sorbed in mg per g spongolite.

| Sample Code | Treatment | Calcining Temperature ° C. | P input per test in mg | P sorbed per 1 g spongolite mg/g | PRI |
|---|---|---|---|---|---|
| Example 4 - 100 µg/ml | | | | | |
| F1 | calcine | 600 | 4 | 0.814 | 14 |
| F2 | calcine | 625 | 4 | 0.874 | 16 |
| F3 | calcine | 650 | 4 | 0.767 | 12 |
| F4 | calcine | 675 | 4 | 0.644 | 9 |
| F5 | calcine | 700 | 4 | 0.604 | 9 |
| G1 | 5% ferrous sulphate, calcine | 600 | 4 | 1.235 | 32 |
| G2 | 5% ferrous sulphate, calcine | 625 | 4 | 1.804 | 185 |
| G3 | 5% ferrous sulphate, calcine | 650 | 4 | — | — |
| G4 | 5% ferrous sulphate, calcine | 675 | 4 | 1.715 | 121 |
| G5 | 5% ferrous sulphate, calcine | 700 | 4 | 1.141 | 27 |
| H1 | 15% ferrous sulphate, calcine | 600 | 4 | 1.968 | 1223 |
| H2 | 15% ferrous sulphate, calcine | 625 | 4 | 1.985 | 2673 |
| H3 | 15% ferrous sulphate, calcine | 650 | 4 | — | — |
| H4 | 15% ferrous sulphate, calcine | 675 | 4 | 1.928 | 537 |
| H5 | 15% ferrous sulphate, calcine | 700 | 4 | 1.433 | 51 |

The results demonstrate that calcining and/or metal sulphate treatment causes a very significant increase in the phosphate binding capacity of spongolite. The optimum temperature for calcining spongolite which has not been treated with ferrous solution is 500° C., which causes a 20-fold increase in PRI (Table 2 and FIG. 3, sample A3). Spongolite treated with ferrous sulphate solution prior to calcining causes an even greater increase in PRI, for example 100-fold. The optimal temperature for calcining of ferrous sulphate treated spongolite is higher than that of untreated spongolite, at 650-675° C. (see Table 2, FIG. 3, FIG. 5a and FIG. 7).

TABLE 2

Treatment conditions and results from Examples 2-4.

| Sample Code | Treatment | Calcining temperature ° C. | Phosphorous Solution (µg/ml) | PRI |
|---|---|---|---|---|
| Example 2 | | | | |
| — | untreated | — | 10 | 26 |
| A1 | calcine | 400 | 10 | 289 |
| A2 | calcine | 450 | 10 | 394 |
| A3 | calcine | 500 | 10 | 494 |
| A4 | calcine | 550 | 10 | 351 |
| A5 | calcine | 600 | 10 | 329 |
| A6 | calcine | 650 | 10 | 149 |
| A7 | calcine | 700 | 10 | 163 |
| A8 | calcine | 750 | 10 | 37 |
| A9 | calcine | 800 | 10 | 30 |
| B1 | 10% ferrous sulphate, calcine | 400 | 10 | 736 |
| B2 | 10% ferrous sulphate, calcine | 450 | 10 | 669 |
| B3 | 10% ferrous sulphate, calcine | 500 | 10 | 278 |
| B4 | 10% ferrous sulphate, calcine | 550 | 10 | 479 |
| B5 | 10% ferrous sulphate, calcine | 600 | 10 | 740 |
| B6 | 10% ferrous sulphate, calcine | 650 | 10 | 3286 |
| B7 | 10% ferrous sulphate, calcine | 700 | 10 | 2667 |
| B8 | 10% ferrous sulphate, calcine | 750 | 10 | 1599 |
| B9 | 10% ferrous sulphate, calcine | 800 | 10 | 235 |
| Example 3 | | | | |
| C1 | calcine | 600 | 10 | 224 |
| C2 | calcine | 625 | 10 | 367 |
| C3 | calcine | 650 | 10 | 190 |
| C4 | calcine | 675 | 10 | 87 |
| C5 | calcine | 700 | 10 | 51 |
| D1 | 5% ferrous sulphate, calcine | 600 | 10 | 680 |
| D2 | 5% ferrous sulphate, calcine | 625 | 10 | 837 |
| D3 | 5% ferrous sulphate, calcine | 650 | 10 | 930 |
| D4 | 5% ferrous sulphate, calcine | 675 | 10 | 1278 |
| D5 | 5% ferrous sulphate, calcine | 700 | 10 | 959 |
| E1 | 15% ferrous sulphate, calcine | 600 | 10 | 653 |
| E2 | 15% ferrous sulphate, calcine | 625 | 10 | 1576 |
| E3 | 15% ferrous sulphate, calcine | 650 | 10 | 1471 |
| E4 | 15% ferrous sulphate, calcine | 675 | 10 | 1367 |
| E5 | 15% ferrous sulphate, calcine | 700 | 10 | 1221 |
| Example 4 | | | | |
| F1 | Calcine | 600 | 100 | 14 |
| F2 | Calcine | 625 | 100 | 16 |
| F3 | Calcine | 650 | 100 | 12 |
| F4 | Calcine | 675 | 100 | 9 |
| F5 | Calcine | 700 | 100 | 9 |
| G1 | 5% ferrous sulphate, calcine | 600 | 100 | 32 |
| G2 | 5% ferrous sulphate, calcine | 625 | 100 | 185 |
| G3 | 5% ferrous sulphate, calcine | 650 | 100 | 61 |
| G4 | 5% ferrous sulphate, calcine | 675 | 100 | 121 |
| G5 | 5% ferrous sulphate, calcine | 700 | 100 | 27 |
| H1 | 15% ferrous sulphate, calcine | 600 | 100 | 1223 |
| H2 | 15% ferrous sulphate, calcine | 625 | 100 | 2673 |
| H3 | 15% ferrous sulphate, calcine | 650 | 100 | 77 |
| H4 | 15% ferrous sulphate, calcine | 675 | 100 | 537 |
| H5 | 15% ferrous sulphate, calcine | 700 | 100 | 51 |

Example 5: Spongolite Mineral Assay

Six different untreated spongolite samples were assayed for their mineral composition. The physical description and assay results are shown in Tables 3-5 below. The six samples were analysed via Acid Digestable metals (dry wt basis) by digestion and ICPAES (USEPA 3051A modification) by the Chem Centre. More colours of spongolite were identified and analysed by Bioscience through Microwave Digestion and Flame AAS for content of aluminium, calcium, copper, iron, magnesium and manganese (Table 6).

TABLE 3

Physical description and true density determined by air comparison pyncometry

| Sample Marks | FSL Lab No. | Physical Description | True Density (g/cm³) |
|---|---|---|---|
| White Light | 001 | Single fragment of relatively soft and flaky, pale cream, homogeneous rock with superficial iron oxide staining. The rock contains numerous ovoid cavities 0.25-1.0 mm in size lined with very pale brown to colourless clay. | 2.5 |
| Purple/Dense | 002 | Three fragments of pale-purple rock with disseminated pale-mustard to orange ferric oxides penetrating parts of the surface. The rock contains ovoid cavities 0.25-1.0 mm in size, most concentrated in patches and lined with brownish wax clay. | 1.9 |
| Yellow | 003 | Mottled boulder, pervasively stained by iron oxides, but with remnant patches or small inclusions of both purplish and white rock. Dispersed through the rock are microscopic ovoid cavities (average ~0.5 mm) lined with brownish clay or organic matter. | 2.2 |
| Yellow/purple stripes | 004 | Massive, pale yellowish-brown, iron-oxide-stained boulder with several prominent purple laminations 0.5-2 mm thick. The rock contains abundant ovoid cavities up to 1 mm in size lined with brown or red clay. | 2.2 |
| White/purple | 005 | Massive pale brown rock with patchy, pale-yellow and pale-purple, staining. The rock contains microscopic ovoid cavities (average ~0.5 mm), concentrated in layers and partially filled with greenish-brown waxy clay. | 2.1 |
| Yellow/purple | 006 | Mottled rock, mostly stained by pale orange-brown iron oxides, but with patches of purple colour. Abundant microscopic (0.25-1 mm) ovoid cavities partially lined by suspected iron oxide. | 2.3 |

TABLE 4

Mineralogical composition determined using XRPD and EDX analysis

| Sample Marks | FSL Lab No. | Crystalline minerals detected by XRPD and estimated concentration in weight percent | | | | | | | | |
|---|---|---|---|---|---|---|---|---|---|---|
| | | Quartz | Microcline feldspar | Dioctahedral Mica | Kaolinite | Goethite | Interstratified clay | Gypsum | Halite | Opal cristobalite |
| White Light | 001 | 8-10 | <2 | 5-7 | 30-35 | n.d.² | n.d. | n.d. | n.d. | 45-55 |
| Purple/Dense | 002 | 6-8 | <2 | <2 | 20-25 | 5-7 | n.d. | n.d. | 6-8 | 50-60 |
| Yellow | 003 | 7-9 | <2 | 2-3 | 7-10 | 10-12 | n.d. | n.d. | 3-4 | 60-70 |
| Yellow/purple stripes | 004 | 6-8 | <2 | 2-3 | 25-30 | 10-12 | n.d. | n.d. | 3-4 | 45-55 |
| White/purple | 005 | 5-7 | <2 | 2-3 | 20-25 | 5-7 | 2-3 | n.d. | 5-7 | 50-60 |
| Yellow/purple | 006 | 6-8 | <2 | <2 | 9-13 | 10-12 | n.d. | <2 | 2-3 | 60-70 | n.d. = not detected

TABLE 5

Mineral Assay via Acid Digestable metals by digestion and ICPAES

| | | Colour | | | | | |
|---|---|---|---|---|---|---|---|
| Analyte | Unit | White | Purple | Yellow | Yellow/Purple Stripes | White/Purple | Yellow/Purple |
| Aluminium | mg/kg | 31,400 | 20,000 | 11,600 | 25,400 | 22,200 | 11,000 |
| Arsenic | mg/kg | 1 | 13 | 22 | 22 | 5 | 25 |
| Copper | mg/kg | 3.7 | 3.1 | 5.7 | 4.3 | 1.7 | 17 |
| Iron | mg/kg | 6,400 | 31,000 | 68,000 | 54,000 | 34,000 | 67,000 |
| Lanthanum | mg/kg | 15 | 7.9 | 6.5 | 10 | 8.8 | 4.5 |
| Manganese | mg/kg | 21 | 12 | 11 | 7.9 | 8.5 | 4.6 |
| Mercury | mg/kg | <0.02 | <0.02 | <0.02 | <0.02 | <0.02 | <0.02 |
| Vanadium | mg/kg | 17 | 45 | 75 | 56 | 49 | 67 |

TABLE 6

Mineral Assay Bioscience via Microwave Digestion
and Flame AAS for additional colours

| Analyte | Unit | Colour | | | | | |
| --- | --- | --- | --- | --- | --- | --- | --- |
| | | Mix | Red | Brown | Rose | Pink | Purple |
| Aluminium | mg/kg | 26,500 | 13,200 | 16,300 | 15,300 | 4,900 | 27,400 |
| Calcium | mg/kg | 165.6 | 59.6 | 91.9 | 79.8 | 64.6 | 119.5 |
| Copper | mg/kg | 8.38 | 2.38 | 3.99 | 1.79 | 3.18 | 3.39 |
| Iron | mg/kg | 56,300 | 25,500 | 10,800 | 12,800 | 50,100 | 46,700 |
| Magnesium | mg/kg | 954.7 | 491.5 | 1025 | 754.9 | 171.8 | 1125 |
| Manganese | mg/kg | 8.38 | 8.94 | 9.19 | 10.7 | 9.54 | 8.17 |

Example 6: PRI Determination of Spongolite Treated with Different Transition Metals Before Calcining Treatment of spongolite with other transition metals was tested using as the method described in Example 2 and 3.
Treatment with Iron, Manganese and Copper Manganese, copper and iron were used in the form of manganese sulphate monohydrate (manganese sulphate; $MnSO_4 \cdot H_2O$), copper sulphate pentahydrate (copper sulphate; $CoSO_4 \cdot 5H_2O$), and ferrous sulphate heptahydrate (ferrous sulphate; $FeSO_4 \cdot 7H_2O$), respectively. Manganese, copper and iron in the form of sulphates all have oxidation states of 2+. Spongolite was soaked in a 10% solution of either ferrous sulphate, manganese sulphate or copper sulphate for two hours and subsequently calcined at 675° C.

Figure 9:
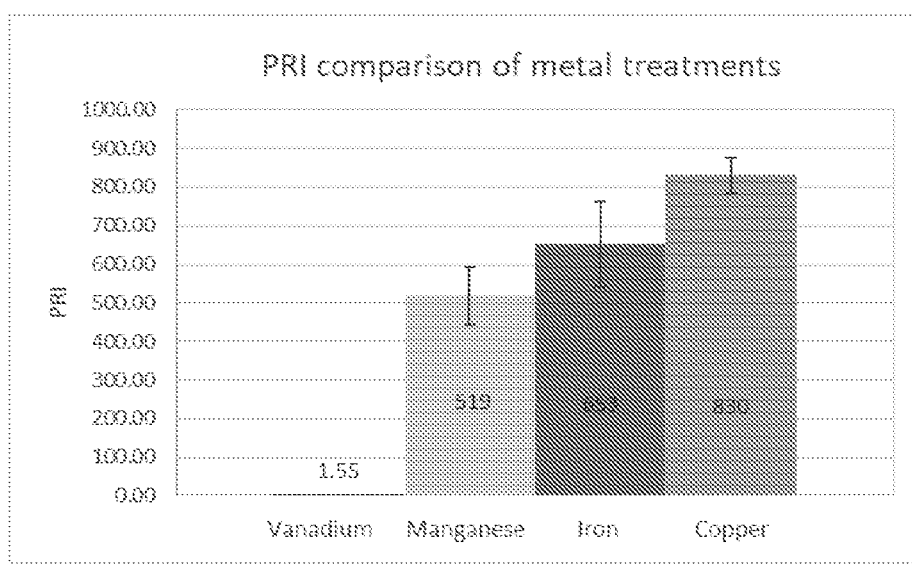
FIG. 9 is a graph showing the PRIs of vanadium, manganese, copper and iron treated spongolite.

The treatment with manganese or copper, and subsequent calcining, markedly increased the PRI with results akin to the iron treatment, as shown in FIG. 9.

Figure 10:
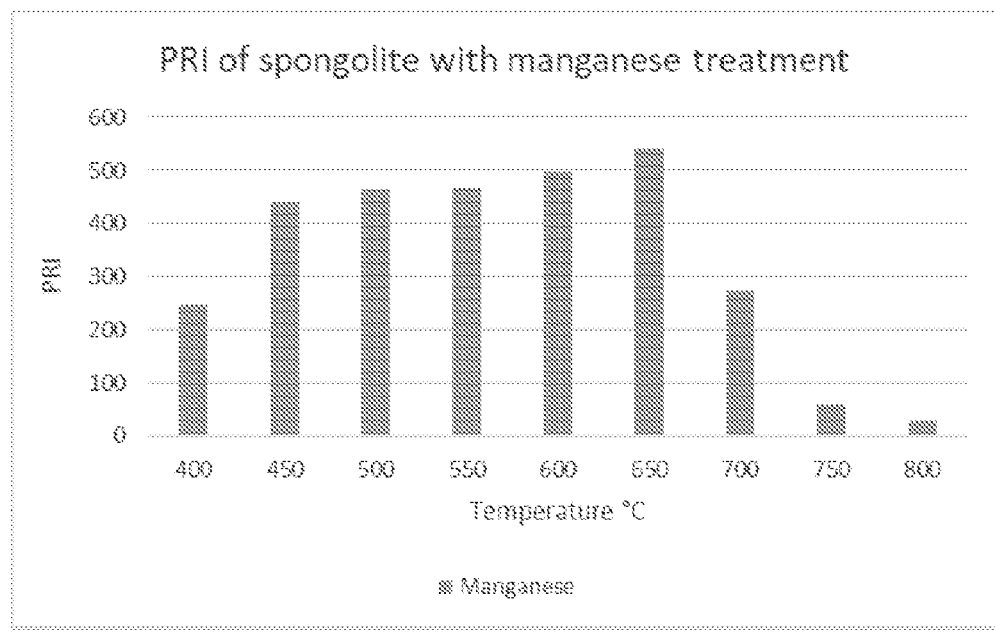
FIG. 10 is a graph showing the PRIs at different temperatures of manganese treated spongolite.
Figure 11:
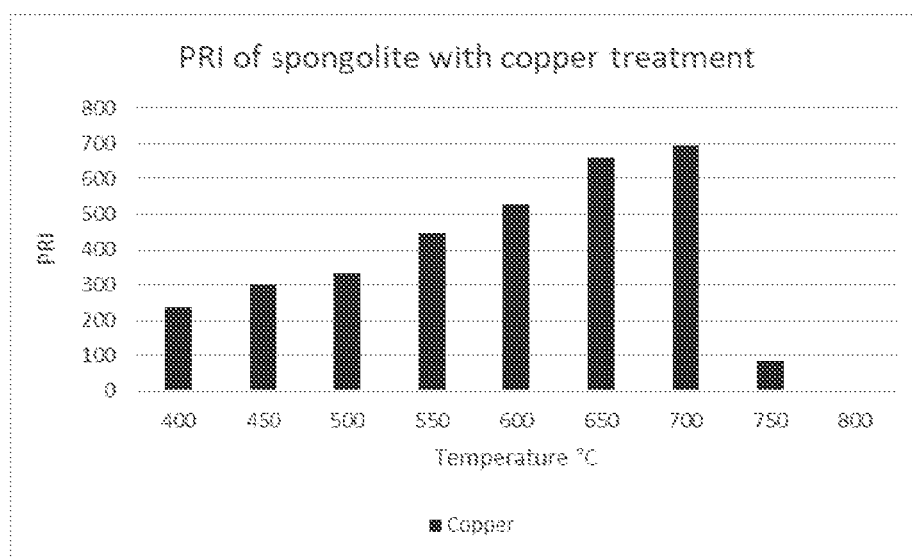
FIG. 11 is a graph showing the PRIs at different temperatures of copper treated spongolite.

The optimum calcining temperature for the highest PRI was determined for manganese and copper as 650° C. and 700° C., respectively as identified in FIGS. 10 and 11. The optimum temperature was chosen as between the best and second-best PRI results to allow for a greater optimum temperature range and to buffer small temperature variations. Thus, the optimum temperature for manganese is 625° C. and for copper 675° C. (same as for iron, FIG. 12).
Treatment with Vanadium Vanadium has an oxidation state of +5 in the form of vanadium pentoxide ($VO_5$). Vanadium pentoxide does not have good water solubility; therefore, it was dissolved in an alkaline 0.25 mol/L potassium carbonate solution. Only 2.5 g vanadium pentoxide was able to be dissolved in a 100 ml solution. Nevertheless, the spongolite was soaked in the 2.5% vanadium pentoxide solution for two hours and subsequently calcined at 675° C.

The vanadium treatment interfered with the colouring agent of the analysing method and samples were sent to SGS Australia soil testing facilities (28 Reid Road Perth, Western Australia, Australia) for phosphorous analysis by ICP (inductively coupled plasma) spectrometry. For the three replicates, the average PRI was 1.55 as shown in Table 5. A soil with a PRI of 1.55 is considered very low phosphorous binding soil, therefore the vanadium pentoxide treated and calcined spongolite had a very low phosphorous binding ability.

The treatment with vanadium pentoxide prior to calcining did not increase PRI of spongolite, in fact it led to a decrease in phosphorous sorption. Without being bound by theory, it is postulated that either the vanadium pentoxide or the potassium carbonate that was used to increase the solubility of the vanadium pentoxide interfered with the phosphorous binding process. However, this requires further investigation.

Vanadium pentoxide differs from other transition metals because of its insolubility. The addition of potassium carbonate to increase the solubility of vanadium pentoxide resulted in a concomitant increase in the pH. As shown in Example 2 and FIG. 15, a higher pH can reduce phosphorous sorption. Another difference is the oxidation state of vanadium of +5 whereas the other metals have oxidation states of +2 and possibly +3 after calcining. The calcining temperature of 675° C. was possibly not ideal for vanadium pentoxide treatment, as optimum calcining temperatures differed between the transition metals as discussed below.

Under the described conditions vanadium pentoxide treatment did not increase phosphorous sorption. However, alternative calcining conditions and/or methods to produce vanadium solutions may improve the ability of vanadium treated and calcined spongolite to increase phosphorous sorption.
Effect of Metal Treatment on PRI The PRI testing was conducted on three replicates of each sample according to the Chem-Centre Method as described above in Example 2 and the results are shown in FIG. 9 and Table 7. The metal sulphate treatment and subsequent calcining increased the PRIs of spongolite substantially. Untreated spongolite (no calcining and/or metal sulphate treatment) gave a PRI of 19. Calcined spongolite had a PRI of 248. PRI results for spongolite with manganese sulphate treatment followed by calcining were within the PRI range of 423-604 for three replicates with an average PRI of 519 (Table 7). For ferrous sulphate treatment followed by calcining, PRIs were in the range of 553-807 with an average of 653. The three samples treated with copper sulphate followed by calcining had PRIs within the range 764-863, the average PRI was 830 (FIG. 9).

TABLE 7

PRI of spongolite treated with different transition metals

| Transition Metal Treatment | PRI Range | Average PRI |
| --- | --- | --- |
| Iron | 553-807 | 653 |
| Manganese | 423-604 | 519 |
| Copper | 764-863 | 830 |
| Vanadium | 1-3 | 1.55 |

Determining the Impact of the Different Treatments on Phosphorous Sorption

The phosphorous sorption represented by the PRI was tested in spongolite treated with vanadium pentoxide, manganese sulphate, copper sulphate or ferrous sulphate before calcining. As shown in FIG. 9, the PRI of spongolite treated with copper sulphate, manganese sulphate or ferrous sulphate is much higher than of spongolite treated with vanadium pentoxide. Even though the PRIs of ferrous sulphate, manganese sulphate and copper sulphate treated spongolite vary, the phosphorous sorption performance was highly improved for all of them. Compared to untreated spongolite (no calcining and/or metal sulphate treatment) which had PRIs between 19-28, PRIs improved more than 20-fold with metal sulphate treatment and calcining. The PRI difference between ferrous sulphate, manganese sulphate and copper sulphate was high, but the actual phosphorous sorption did not vary much among the three metal-treated spongolite samples. A PRI of 830 (copper sulphate treated) translates to a phosphorous sorption of 97.7% of all applied phosphorous, whereas a PRI of 519, as measured for manganese sulphate, translates to a phosphorous sorption of 96.3% of all applied phosphorous. It is to be noted that a 10% metal sulphate solution does not translate to an equal amount of metal between the metal treatments. 10% ferrous sulphate equals 2% iron, 10% manganese sulphate equals 3.3% manganese and 10% copper sulphate equals 2.5% copper. Iron and copper treatment seemed to be more efficient than manganese, because even though the manganese content is highest, the PRI is lower than for iron and copper treatment. For better comparison an equal amount of each metal of 3% was chosen for another test (Example 8).

The variations between the three replicates were smallest for copper sulphate while its PRIs were highest (830 on average) which means copper sulphate treatment could be considered an alternative to ferrous sulphate treatment.

Calcining Temperature

PRIs of spongolite treated with copper sulphate were higher than that for manganese sulphate and ferrous sulphate treated spongolite. This may be due to the calcining temperature of 675° C. which was previously determined to be the optimum calcining temperature for ferrous sulphate (which was tested at temperatures between 400° C. and 800° C. in 50-degree increments). It was initially presumed this may also be the optimal temperature for other transition metals as well.

At high temperatures, transition metals change their oxidation state, which may lead to increased phosphorous sorption depending on the oxidation state reached. Manganese can reach oxidation states between −3 to +7 with the most common being +2, +3, +4, +6, +7. In the form of manganese sulphate, manganese has an oxidation state of +2. This test has shown manganese sulphate treatment improves phosphate sorption of spongolite. To investigate optimum calcining temperatures, manganese sulphate treated spongolite was calcined at temperatures between 400° C. and 800° C.

Copper can exhibit oxidation states of −2 and 0 to +4 with the most common being +2. In the form of copper sulphate, the oxidation state of copper is +2 as it is for iron and manganese. For copper calcining temperatures between 400° C. and 800° C. were also tested.

Figure 12:
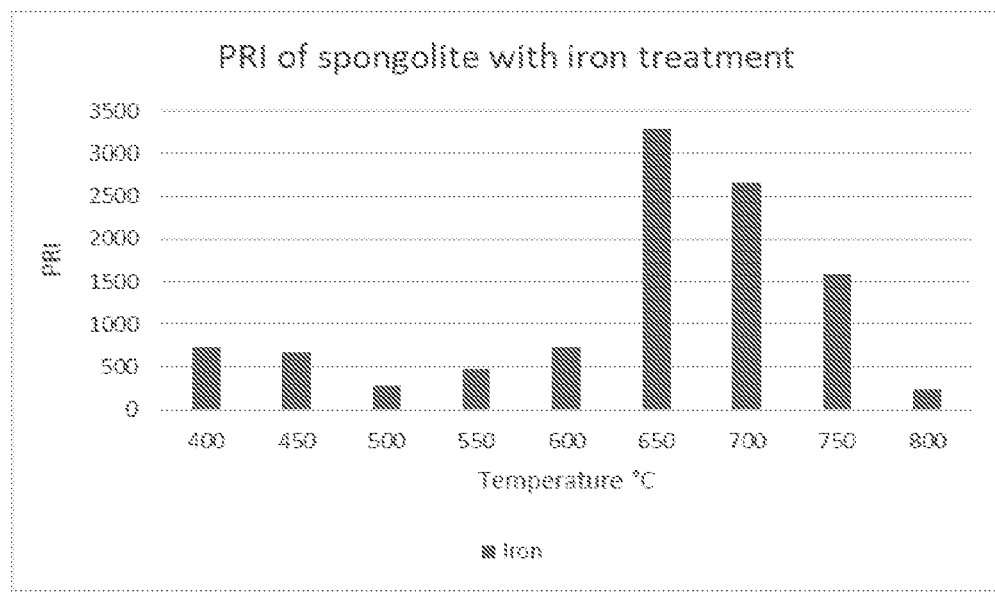
FIG. 12 is a graph showing the PRIs at different temperatures of iron treated spongolite.

The comparison of iron oxidation, manganese oxidation and copper oxidation treated spongolite at calcining temperatures between 400° C. and 800° C. is shown in FIGS. 10-12. Tests have identified optimum temperatures for manganese sulphate and copper sulphate treatment. Manganese sulphate treated spongolite had highest PRIs at 650° C. (PRI 543). The PRI for copper sulphate treatment was highest at 700° C. at a PRI value of 694.

As for ferrous sulphate, the optimum temperature was chosen between the best and second-best PRI result to allow for a greater optimum temperature range and to buffer small temperature variations. Thus, the optimum temperature for manganese sulphate treatment was determined to be 625° C. and 675° C. for copper sulphate treatment (same as for iron).

The PRI testing of ferrous sulphate treated spongolite was conducted in January (Australian summer; average daytime temperature (Perth) 30° C.), whereas manganese sulphate and copper sulphate were tested in July (Australian winter; average daytime temperature (Perth) 18° C.). It is possible that the ambient temperature may have influenced the phosphorous sorption during the tumbling period. By comparing FIGS. 8 and 12, the PRIs for ferrous sulphate treated spongolite dropped to about 700 compared to PRIs of 2,500-3,000 as shown in FIG. 12 which may be due to the ambient temperature decrease between January and July. However, it is worth noting that a PRI of 2,500 translates to a phosphorous sorption of 99.2%, whereas a PRI of 653 translates to 97% phosphorous sorption. Although the PRI is 4-fold higher, the actual phosphorous sorption is only increased by 2.2%. The effect of this was that the difference between the two batches of treated spongolite did show slight differences in their phosphorous sorption performance at the time of analysis.

Further work should therefore be conducted in a climate controlled room, set to a constant temperature of 25° C. for the maximum sorption capacity and phosphorous sorption curve tests of the different metals to avoid temperature influences.

Example 7: Phosphorous Sorption Curve to Determine Maximum Phosphorous Sorption and Influence of pH on Phosphorous Sorption As discussed above in Example 2, treatment of spongolite with ferrous sulphate and subsequent calcining increased the phosphorous sorption capacity of the spongolite. The phosphorous sorption was determined by the phosphorous retention index (PRI). The PRI is useful to compare different types of soil for its phosphorous sorption at a given concentration, but to determine the maximum phosphorous sorption capacity a phosphorous sorption curve test was necessary. The phosphorous sorption curve is obtained by repeating the procedure as conducted for PRI testing with increasing concentrations of phosphorous in the equilibration solution, until the sample is 'saturated' with phosphate. The amount of phosphate sorption when the sample is saturated determines the maximum sorption capacity of the sample. Results are provided in phosphorous in the form of phosphate.

For this analysis, spongolite was treated with a 10% ferrous sulphate solution and calcined at a temperature of 675° C.

The method is described as 'phosphate sorption curve' in Rayment and Lyons (2011); however, all concentrations and results are given in amounts of elemental phosphorous derived from phosphate (Phosphate-P). Results given in elemental phosphorous can easily be converted to phosphate through multiplying with the factor 3.1 which derives from the ratio of molecular mass of phosphorous (P) and phosphate ($PO_4^{3-}$).

The phosphate sorption curve test is based on the method 9J as outlined in Rayment and Lyons, Soil Chemical Methods—Australasia, (2011). Like the PRI testing method, an equilibration solution that has a known phosphorous concentration (equilibration solution) is added to a spongolite sample in a test vessel. After 17 hours of tumbling, the solution that is recovered from the test vessel is referred to as the supernatant solution. During this tumbling period, it is expected the spongolite will sorb phosphorous from the equilibration solution; and so, the equilibration phosphorous concentration will be greater than the supernatant phosphorous concentration. The measurable difference in phosphorous concentration between the equilibration and supernatant solutions enables us to determine the amount of phosphorous that has been sorbed by the spongolite. By relating the amount of phosphorous sorbed to the weight of the sample, the sorption capacity (expressed as mg phosphorous per kg spongolite) can be determined. The maximum sorption capacity can be determined when the sample is saturated with phosphorous.

For this analysis, spongolite was treated with a 10% ferrous sulphate solution and calcined at a temperature of 675° C. Previous testing identified that this ferrous sulphate concentration and calcining temperature resulted in the highest PRI. Due to the high PRIs for spongolite that had undergone this treatment, the equilibration concentrations of the phosphate sorption curve were increased from those in the described method (Rayment and Lyons 2011). The method was originally developed for Australian soils that generally have low phosphorous sorption capacity and hence use low equilibration concentrations which were not suitable for spongolite.

This test procedure and results are described in Test 1 below. The subsequent tests were based on the findings of Test 1. As the concentrations of the phosphorous equilibration solutions were increased from those described by Rayment and Lyons (2011), the pH of the supernatant concentration was affected. With increasing phosphorous concentrations, the pH steadily increased. Therefore, tests to adjust the pH at higher concentrations were undertaken (Tests 2-3) as described below.

Test 1—Phosphate Sorption Curve

As described above, spongolite granules (particle size 1-2 mm) were pre-soaked in a 10% ferrous sulphate solution and calcined at a temperature of 675° C. The equilibration concentrations used to create the phosphate sorption curve are shown in Table 8. Five increasing equilibration concentrations were used in the first test. Five test tubes were prepared, each containing 5 g of spongolite and 50 ml of one of the five equilibration concentrations to maintain the 1:10 sample to solution ratio.

TABLE 8

Phosphorous Sorption Test 1

| | | | | | |
|---|---|---|---|---|---|
| Equilibration Concentration (µg/L) | 50000 | 100000 | 200000 | 400000 | 800000 |
| Supernatant Concentration (µg/L) | 500 | 1410 | 6115 | 192051 | 734615 |
| Sorption Capacity (mg/kg) | 495 | 986 | 1939 | 2079 | 654 |
| pH of Supernatant Solution | 4.1 | 4.1 | 4.4 | 5.1 | 5.5 |

Figure 13:
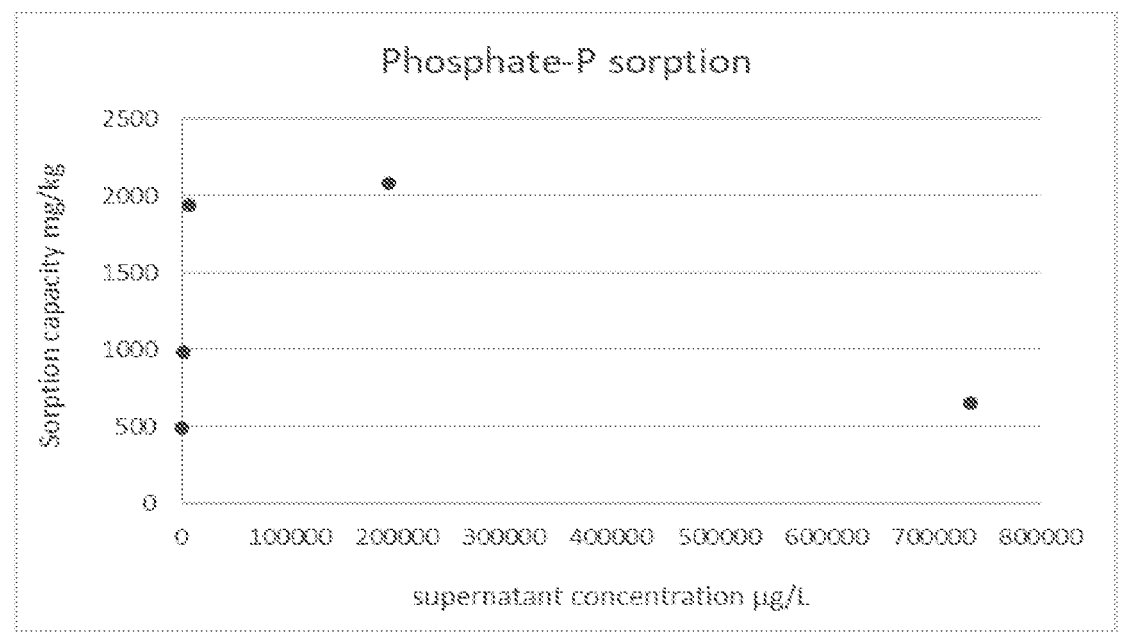
FIG. 13 is a graph showing the P sorption capacity—x-axis; left to right increasing phosphorous concentrations (50, 100, 200, 400, 800 mg/L).

As shown in Table 8, at higher equilibration solution concentrations, the calculated sorption capacity steadily increased and was highest at 2079 mg phosphorous per kg spongolite for an equilibration concentration of 400,000 µg/L. The sorption capacity for 800,000 µg/L was lower, possibly due to the change of pH (FIG. 13). The pH increased with increasing phosphorous equilibration concentrations. It was then postulated that the pH was influencing phosphorous sorption. Therefore, another test series was conducted to investigate phosphorous sorption with equilibration concentrations of equal pH.

FIG. 13 shows the phosphate sorption curve. The points did not form a linear line, so the maximum sorption capacity could not be derived from the graph, but rather from the highest data point itself (2079 mg/kg).

To investigate the unexpected decrease in phosphorous sorption for the 800,000 µg/L (FIG. 13), the pH of the supernatant solution was determined (Table 8). With increasing phosphorous in the equilibration concentration, the pH increased likewise. It was postulated that the pH of the solution was affecting the sorption capacity of the spongolite. For consistent baseline conditions (equal pH) of all equilibrium concentrations, the phosphate sorption curve test was repeated with a phosphate buffer solution used in place of the phosphorous equilibration solution specified by Rayment and Lyons (2011). A buffer solution can keep the pH stable when small amounts of acid or base are added. The purpose of using a buffer as the phosphorous equilibration solution for the phosphate sorption curve was to maintain a consistent pH across all equilibration concentrations so the only variable between the samples was the phosphorous concentration.

Test 2—Phosphate Sorption Curve with Phosphate Buffer

The structure and preparation of the spongolite in Test 2 was identical to Test 1 with the exception of the preparation of the phosphorous equilibration concentrations. To achieve five equilibration concentrations with equal pH, a phosphate buffer with a pH of 6.88 was prepared from monobasic and dibasic phosphate and then diluted to the required concentrations. The phosphate concentration was 4.77 g/L and total phosphorous was 1.56 g/L. This solution was then diluted to the concentrations of 10, 100, 200, 400, and 800 mg/L of phosphorous. Dilution with de-ionised water resulted in a slight increase in pH for the less concentrated solutions (pH between 6.98-7.16). Results for the equilibration and supernatant concentrations, sorption capacity and pH are shown in Table 9.

TABLE 9

Phosphorous Sorption Test 2

| | | | | | |
|---|---|---|---|---|---|
| Equilibrium Concentration (µg/L) | 10000 | 100000 | 200000 | 400000 | 800000 |
| Supernatant Concentration (µg/L) | 127 | 1767 | 34165 | 211943 | 584435 |
| Sorption Capacity (mg/kg) | 99 | 982 | 1658 | 1880 | 2155 |
| pH of Supernatant Solution | 4.0 | 4.1 | 4.6 | 5.5 | 6.1 |

The five equilibration solutions had minor differences in pH (pH 6.98-7.16) before starting the test. After the tumbling period, the pH of the supernatant solution was acidic, in the pH range of 4.0-6.1 from the lowest to the highest concentration respectively. The pH was closer to 6.88 for higher phosphorous concentrations which were less diluted. The change in preparation of the equilibration concentration did not result in equal pH equilibration concentrations, but it achieved a higher phosphorous sorption capacity (2155 mg/kg) than in Test 1. A phosphorous sorption capacity of 2155 mg phosphorous per kg was equivalent to a phosphate sorption capacity of 6594 mg/kg.

Figure 14:
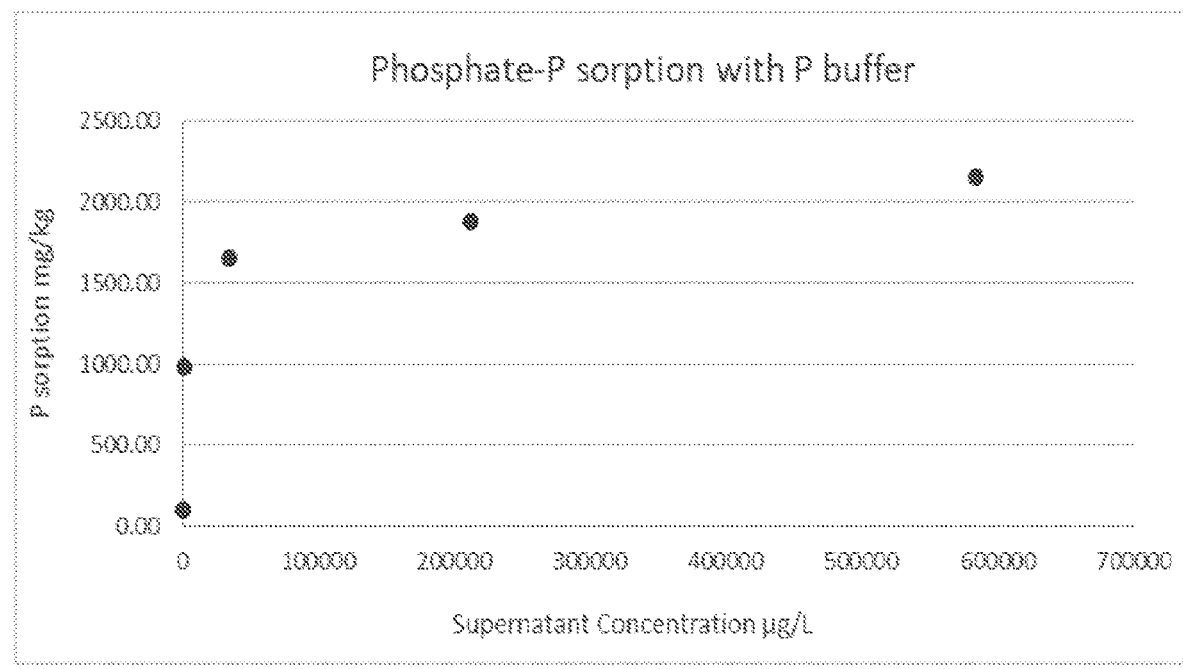
FIG. 14 is a graph showing P sorption using a phosphate buffer; P deriving from di-sodium hydrogen phosphate and mono-potassium dihydrogen phosphate.

FIG. 14 shows the steady increase in phosphorous sorption with increasing phosphorous equilibrium concentrations. Although a buffer solution was used to stabilize the pH, the five different phosphorous concentrations varied in their pH before and after the test. To determine the influence of pH on phosphorous sorption, Test 3 was conducted.

Test 3—Phosphate Sorption Under the Influence of Different pH

Based on the results of Test 1, it was anticipated that phosphorous sorption would vary as a function of the pH of the equilibration solution. The influence of pH on phosphorous sorption was tested by repeating the PRI assay with a series of solutions which contained the same phosphorous concentration, but at a varying pHs. This method was based on the PRI assay as described above, but was not a standardised method, and therefore only provides a guide for the influence of pH on phosphorous sorption. The PRI method was altered by the addition of sodium hydroxide to the test vessel to raise the pH.

An equilibration solution of 20,000 µg/L phosphorous was prepared and 20 ml was added to 6 test tubes which each contained 2 g of spongolite. The additional 20 ml to achieve a sample:solution ratio of 1:20, partially consisted of de-ionised (DI) water and a 0.2 mol/L sodium hydroxide solution. By adding 20 ml of solution which did not contain phosphorous, the equilibrium concentration was diluted to reach 10,000 µg/L phosphorous as required for PRI testing. Sodium hydroxide and DI water were added to adjust the solution to the desired pH (Table 8).

Figure 15:
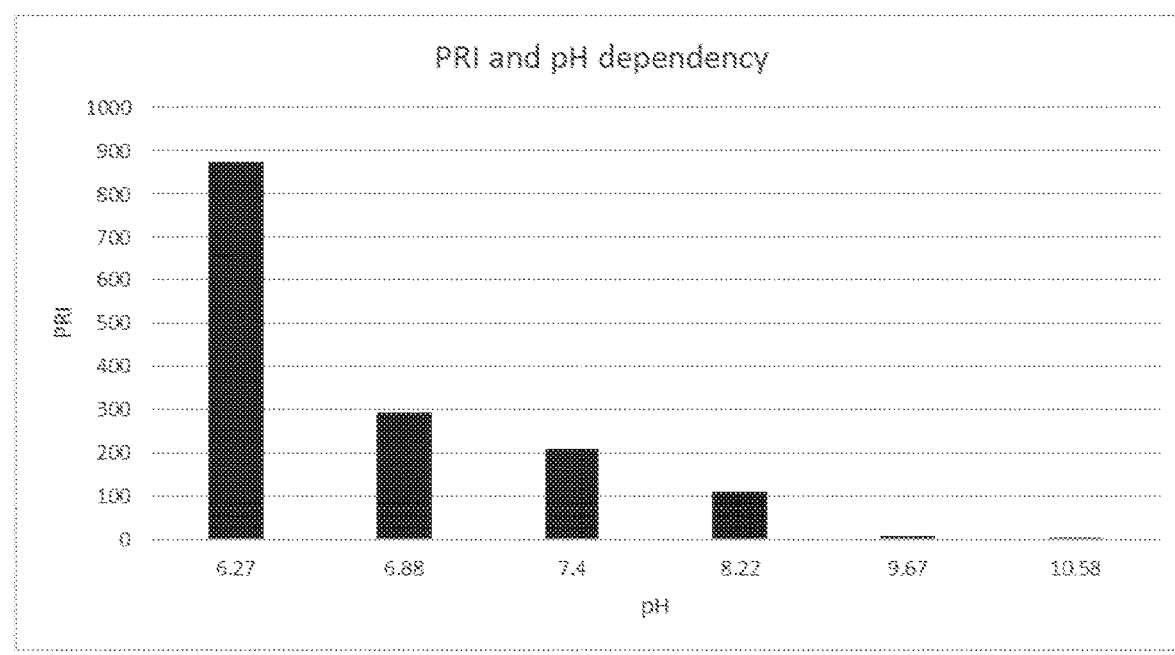
FIG. 15 is a graph showing PRI tests as different pH values for iron treated spongolite.

The six test tubes had the following pH values after the 16 hour tumbling period: 6.3, 6.9, 7.4, 8.2, 9.7 and 10.6. The related PRIs varied between 874 and 2, respectively (Table 10). FIG. 15 (PRI tests at different pH values) shows the PRI at increasing pH. The solution with the lowest pH (6.27) had the highest PRI (874) of the six treatments. With increasing pH the PRI decreased substantially (FIG. 15).

TABLE 10

| PRI tests at different pH values | | | | | | |
|---|---|---|---|---|---|---|
| Equilibrium Concentration (µg/L) | 10000 | 10000 | 10000 | 10000 | 10000 | 10000 |
| Supernatant Concentration (µg/L) | 224 | 643 | 881 | 1580 | 7105 | 9147 |
| PRI | 874 | 291 | 207 | 107 | 8 | 2 |
| Sodium hydroxide added (mg) | 8.5 | 10.1 | 11.9 | 14.4 | 18.1 | 24.6 |
| pH of Supernatant Solution | 6.3 | 6.9 | 7.4 | 8.2 | 9.7 | 10.6 |

Test 4—Further Test Using a Higher Phosphorous Concentration

With the exception of the phosphorous concentration, the method of Test 4 was conducted in accordance with the method as outlined in Test 3. More specifically, 100,000 µg/L phosphorous equilibrium concentration was tested at different pH values for phosphorous sorption. A broader pH range was also prepared for this test series. pH values between 5.24 and 10.31 were obtained.

A broader pH range was prepared for this test series. Because the equation to calculate PRIs is only valid for an equilibrium concentration of 10,000 µg/L, the ratio between adsorbed phosphorous to phosphorous input from the equilibrium concentration was used (% phosphorous sorbed) for comparison. Generally, the PRI does not proportionally represent phosphorous binding as described above, e.g. a doubling the PRI does not equal a doubling in phosphorous sorption. Therefore, an additional comparison was also used calculated from the test results i.e. the percentage of phosphorous sorbed by the spongolite in relation to phosphorous added at the beginning of the test. The percentage of phosphorous sorbed is a linear correlation and enables direct comparison of results.

Figure 16:
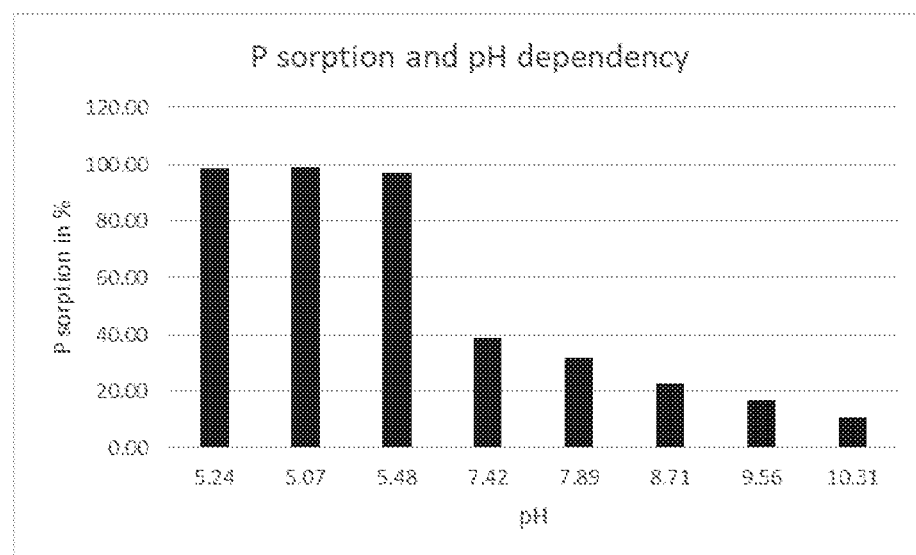
FIG. 16 is a graph showing phosphate sorption at different pH for iron treated spongolite.

Similar to Test 3, the phosphate sorption was highest within the acidic pH range. For samples with pH values lower than 5.48, over 97% of all phosphorous in the solution was sorbed (FIG. 16). This dropped to 39% at a pH of 7.4.

TABLE 11

| Phosphate sorption at different pH values | | | | | | | |
|---|---|---|---|---|---|---|---|
| Equilibrium Concentration (µg/L) | 100000 | 100000 | 100000 | 100000 | 100000 | 100000 | 100000 |
| Supernatant Concentration (µg/L) | 1287 | 937 | 2993 | 61399 | 68112 | 76923 | 88951 |
| Phosphorous sorbed in % | 99 | 99 | 97 | 39 | 32 | 23 | 11 |
| Sodium hydroxide added (mg) | 7.0 | 8.0 | 8.5 | 10.1 | 11.9 | 14.4 | 24.6 |
| pH of Supernatant Solution | 5.2 | 5.1 | 5.5 | 7.4 | 7.9 | 8.7 | 10.3 |

The phosphorous sorption behaviour under varying pH conditions was investigated further. The optimum pH determined in these experiments for spongolite treated with ferrous sulphate was determined to be between 4.0 and 7. However, literature suggests sorption of phosphate and iron is higher at even lower pH values. A high pH (>7) is characterised by an increase in the concentration of hydroxyl ions (OH—). In soil, the hydroxyl ions replace adsorbed phosphate ions. Thus the higher the concentration of hydroxyl ions, the more phosphate will desorb. This process is beneficial for plant growth, because it makes phosphate more available for plant uptake. However, this process is described for soil, in which most phosphate ions are bound to iron or aluminium. Hence, it is the iron/aluminium and phosphate complex that is affected by the hydroxyl ions. In this test series, ferrous sulphate was used to treat spongolite for higher phosphorous sorption and the phosphorous sorption was reduced at higher pH values in the test.

Phosphate ions adsorb onto surfaces via several chemical reactions, some of which are pH dependent. At very low solution pH (<1.3), the main adsorption mechanism is the reaction of phosphate with iron. Within the pH range of 1.3-4.3, the phosphate mainly creates a chemical complex with aluminium. At higher pH values (4.3-7.2), the phosphate ions are commonly in the form of hydrolysed phosphate ions. When the solution reaches pH values of 7.2 and higher, the phosphate ions form complexes with calcium and magnesium (Rayment and Lyons 2011).

CONCLUSION

Tests 3 and 4 revealed a pH optimum between 4 and 7 for highest phosphate sorption for spongolite treated with ferrous sulphate. Rainwater is generally acidic and has a pH of around 5.6. Natural variation of the atmosphere and soil can change the pH of rainwater, however, in the Perth (Australia) area most soils are acidic so that most surface water bodies and drains are anticipated to be slightly acidic and within the optimum range for P sorption. The tests support the strong binding affinity between iron and phosphate at low pH.

Spongolite naturally contains aluminium and possibly also calcium and magnesium which may also contribute to the phosphorous sorption at higher pH values.

Tests 1 and 2 determined a maximum phosphorous sorption of 2079 mg/kg at a pH of 5.1 and 2155 mg/kg at pH 6.1. The phosphorous sorption capacity is expected to increase at lower solution pH or higher equilibration concentrations. As FIG. 14 shows, the spongolite was not yet saturated with phosphate.

Example 8: Phosphorous Sorption Curve to Determine Maximum Phosphorous Sorption for the Three Different Metal Treatments Example 6 has described PRI results for spongolite treated with a 10% metal sulphate solution of either ferrous sulphate, manganese sulphate or copper sulphate prior to calcining. These metal sulphate solutions contained 10% of the metal sulphate, which did not take into account the amount of each metal within the metal sulphate solution. 10% ferrous sulphate equals 2% iron, 10% manganese sulphate equals 3.3% manganese and 10% copper sulphate equals 2.5% copper. For better comparison of the influence on P sorption capacity of the metal treatment, the metal percentage throughout the three treatments should be the same.

In this test series, metal sulphate solutions each containing 3% of the particular metal were prepared. This means that for 3% iron in the solution, a 15% ferrous sulfate solution was prepared, for 3% manganese a 9% manganese sulphate solution was prepared and to reach 3% copper a 12% copper sulphate solution was prepared.

As in previous tests, spongolite granules sized 1-2 mm were soaked for two hours in either of the above described metal sulphate solutions.

Based on the results for optimal calcining temperature of Example 6, the spongolite granules soaked in ferrous sulphate and copper sulphate were calcined separately at 675° C., the spongolite soaked in manganese sulphate at 625° C. for 30 minutes.

A phosphorous sorption curve assay was conducted for each of the three metal treatments. This P sorption assay followed the procedures as described in Example 7 Test 1 with the only difference being an increase in P equilibration concentrations to reach 100, 200, 400, 800 and 1600 mg/L.

TABLE 12

Phosphorous sorption for the three different metals with KCl

| Iron | | | | | |
|---|---|---|---|---|---|
| Equilibration Concentration (μg/L) | 100000 | 200000 | 400000 | 800000 | 1600000 |
| Supernatant Concentration (μg/L) | 1062 | 16076 | 152620 | 524079 | 1267705 |
| Sorption Capacity (mg/g) | 0.99 | 1.84 | 2.47 | 2.76 | 3.32 |
| Copper | | | | | |
| Equilibration Concentration (μg/L) | 100000 | 200000 | 400000 | 800000 | 1600000 |
| Supernatant Concentration (μg/L) | 1827 | 10482 | 137748 | 444759 | 1168555 |
| Sorption Capacity (mg/g) | 0.98 | 1.9 | 2.62 | 3.55 | 4.31 |
| Manganese | | | | | |
| Equilibration Concentration (μg/L) | 100000 | 200000 | 400000 | 800000 | 1600000 |
| Supernatant Concentration (μg/L) | 2550 | 46317 | — | 456091 | 1352691 |
| Sorption Capacity (mg/g) | 0.97 | 1.54 | — | 3.44 | 2.47 |

Figure 17:
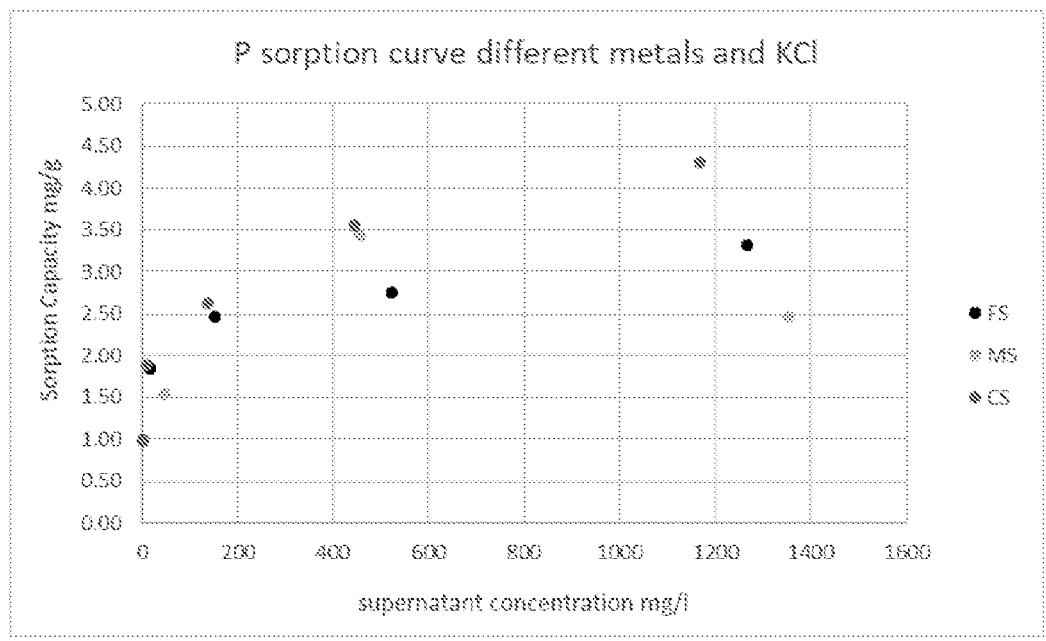
FIG. 17 is a graph showing the P sorption capacity of spongolite with different metal treatments in Potassium Chloride (KCl) P equilibration concentrations.

The test results are shown in FIG. 17 and Table 11. Generally, with increasing P equilibration concentrations the P sorption increased likewise. The only exception is found for manganese treated spongolite. At the highest P equilibration concentration the P sorption capacity dropped from about 3.5 mg/g to 2.5 mg/g. For iron and copper treated spongolite the P sorption capacity was steadily increasing, reaching its peak at 4.3 mg/g for copper and 3.3 mg/g for iron. The increase in iron from 2% to 3% during the metal treatment achieved an increase in P sorption from 2.2 mg/g (Example 7) to 3.3 mg/g (Example 8).

Example 9: Phosphorous Sorption Curve to Determine Maximum Phosphorous Sorption for the Three Different Metal Treatments and Modified Method Spongolite was prepared as described in Example 8, using metal sulphate soaking solutions of 3% of the particular metal and calcined at the optimal temperature.

The only difference to Example 8 is a minor modification in the preparation of the equilibration concentration by using Calcium Chloride (CaCl) instead of Potassium Chloride (KCl). Both are described by Rayment and Lyons (2011) to be suitable for a P sorption curve assay.

Figure 18:
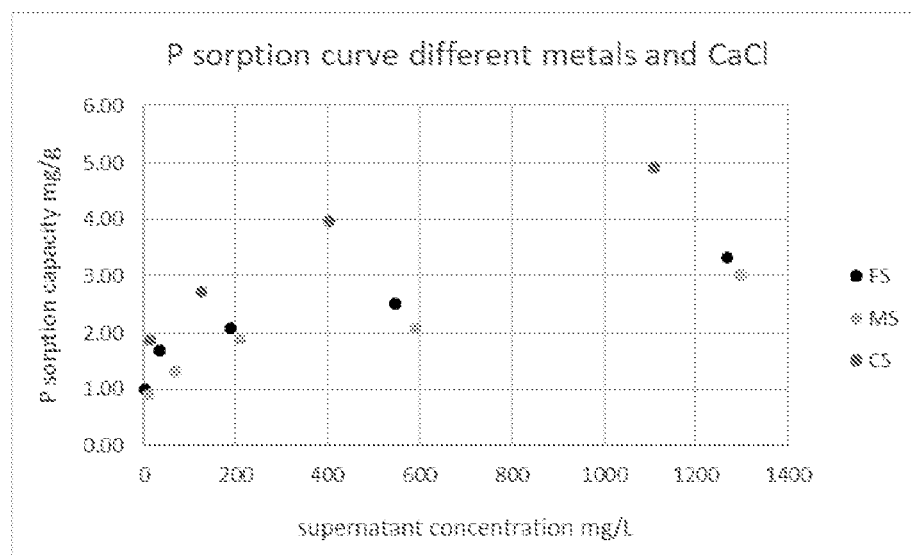
FIG. 18 is a graph showing the P sorption capacity of spongolite with different metal treatments in Calcium Chloride (CaCl) P equilibration concentrations.
Figure 19:
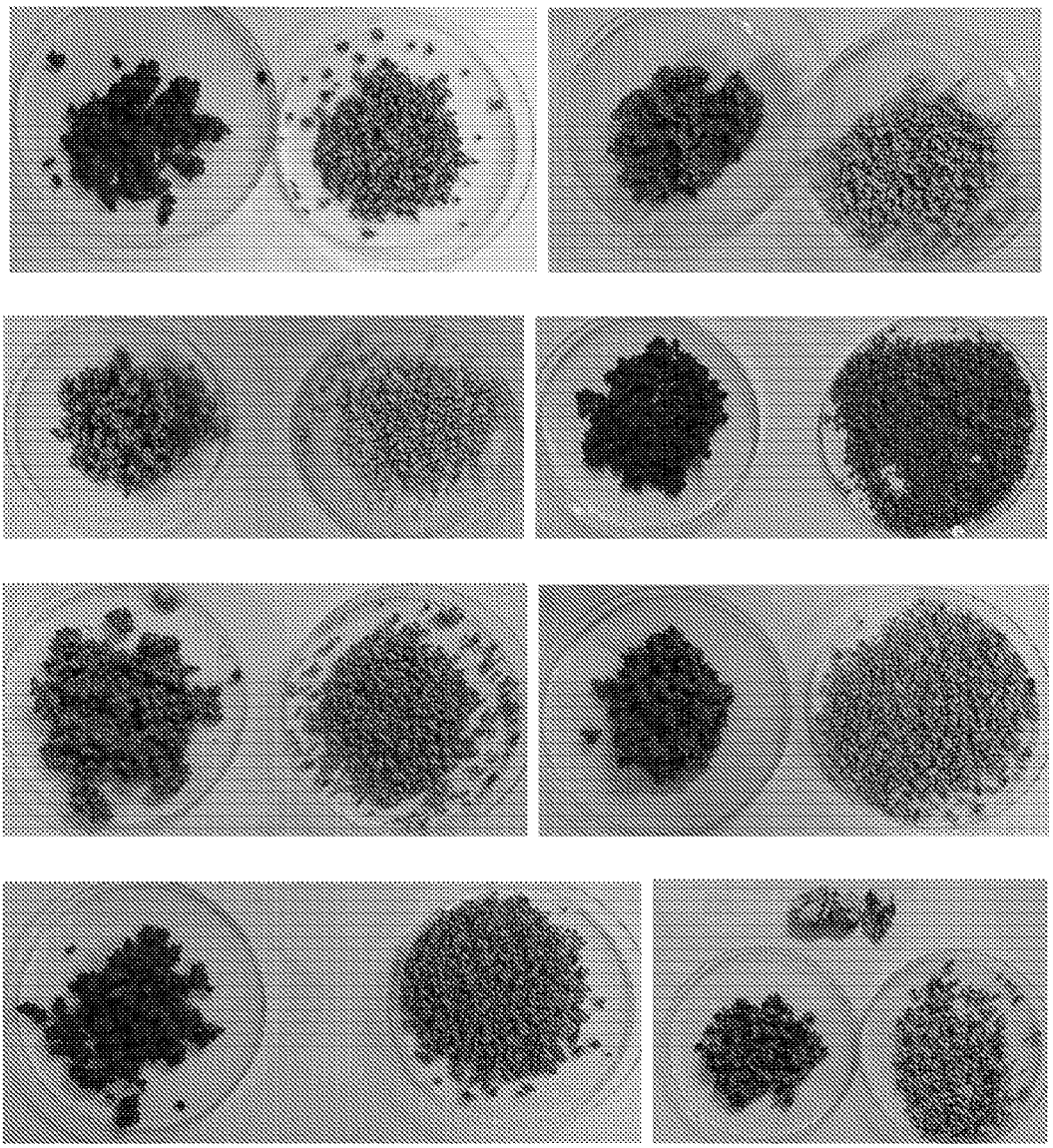
FIG. 19 is a graph showing eight different colours of spongolite: left to right, top to bottom (A) red spongolite; (B) yellow spongolite; (C) white spongolite; (D) purple spongolite; (E) rose spongolite; (F) brown spongolite; (G) pink spongolite (H) white/yellow/purple spongolite.

Results are shown in FIG. 18 and Table 13. Whereas the P sorption capacity for all three metal treatments was increased compared to Example 8, especially the copper treated spongolite increased its P sorption capacity (up to 4.9 mg/g) and distinguished itself from the other two (FIG. 18).

TABLE 13

Phosphorous sorption for the three different metals with $CaCl_2$

| Iron | | | | | |
|---|---|---|---|---|---|
| Equilibration Concentration (μg/L) | 100000 | 200000 | 400000 | 800000 | 1600000 |
| Supernatant Concentration (μg/L) | 865 | 32277 | 190202 | 547550 | 1268012 |
| Sorption Capacity (mg/g) | 0.99 | 1.68 | 2.1 | 2.52 | 3.32 |

TABLE 13-continued

| Phosphorous sorption for the three different metals with $CaCl_2$ | | | | | |
|---|---|---|---|---|---|
| Copper | | | | | |
| Equilibration Concentration (µg/L) | 200000 | 400000 | 800000 | 1600000 | — |
| Supernatant Concentration (µg/L) | 12103 | 126801 | 403458 | 1109510 | — |
| Sorption Capacity (mg/g) | 1.88 | 2.73 | 3.97 | 4.9 | — |
| Manganese | | | | | |
| Equilibration Concentration (µg/L) | 100000 | 200000 | 400000 | 800000 | 1600000 |
| Supernatant Concentration (µg/L) | 9366 | 67435 | 210375 | 590778 | 1296830 |
| Sorption Capacity (mg/g) | 0.91 | 1.33 | 1.9 | 2.09 | 3.03 |

Example 10: Phosphorous Retention Index (PRI) Determination for Different Colours of Spongolite Work on spongolite phosphate sorption capacity when calcined in the presence of metal salts showed relatively high variance between replicates. Earlier work demonstrated different PRI for different coloured spongolite samples, and it was known that different colours were associated with different chemical compositions, especially in their iron and aluminium content.

This example tested whether different coloured spongolite samples behaved differently upon calcining, with and without the presence of metal salts.

Samples of spongolite rocks were sorted according to different colours at a macroscopic and microscopic level. Eight different colours were selected from large rock samples provided. Rocks were crushed, ground, rinsed with tap water and dry sieved. Sieve sizes of 3.15 mm to 1.00 mm were used to match particle sizes to the samples previously provided by Southern Spongolite.

The eight different colours were: red, yellow, white, purple, rose, pink, brown and mix yellow/purple stripes, (FIG. 19A-H; left-right, top-bottom: red, yellow, white, purple, rose, brown, pink, white/yellow/purple). The photos show wet (left) and dry (right) spongolite granules.

Test 1—Comparison of PRI of Different Coloured Spongolite

In the first test, eight different colours of untreated spongolite were tested separately for their PRI properties, according to the method as outlined in Example 1 above.

Figure 20A:
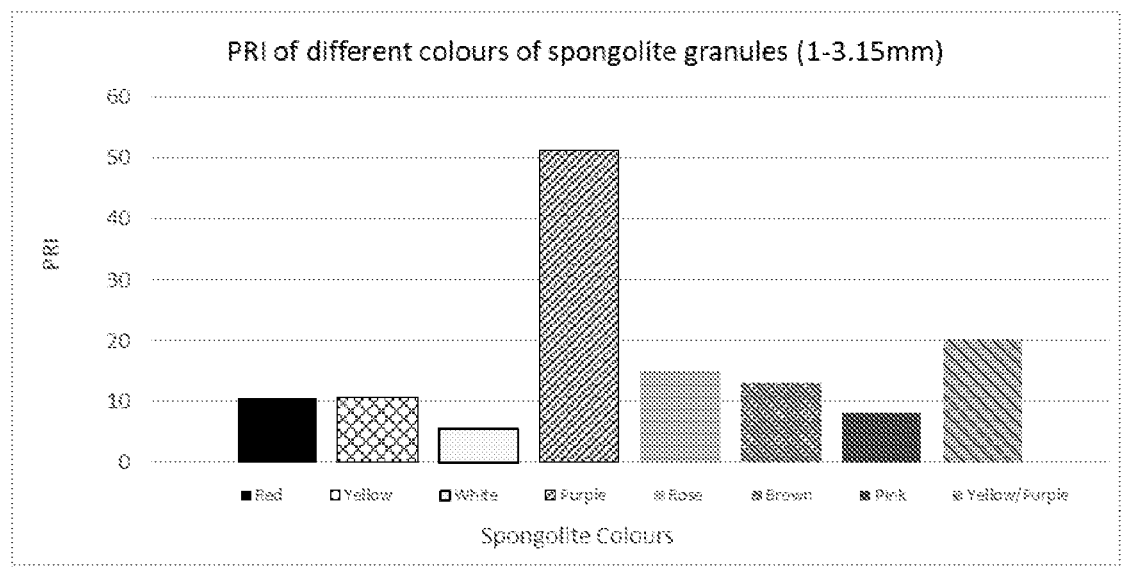
FIG. 20a is a graph showing the PRIs of different colours of spongolite granules sized between 1 and 3.15 mm.
Figure 20B:
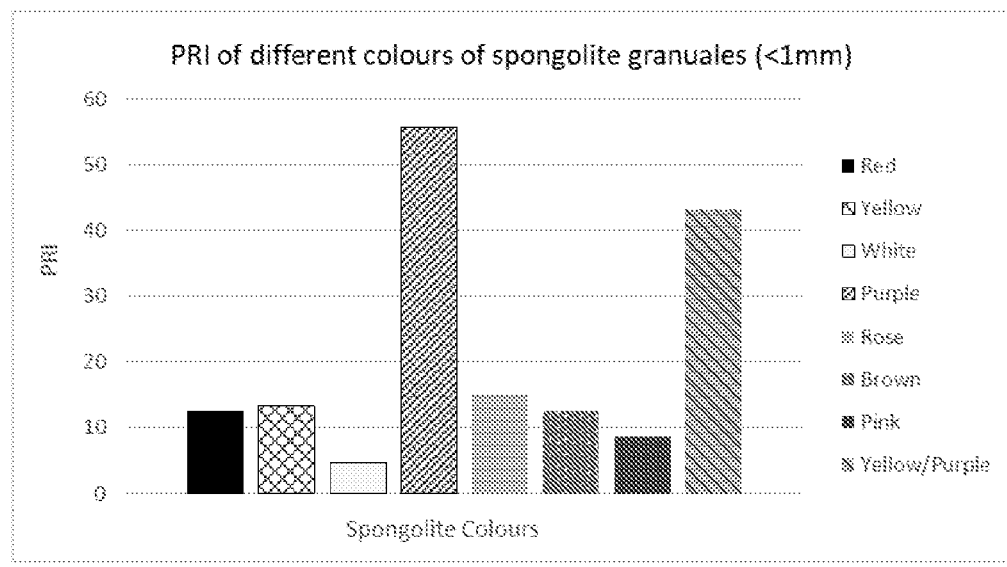
FIG. 20b is a graph showing the PRIs of different colours of spongolite granules smaller than 1 mm.

As shown in FIG. 20a, the PRI test of the dried spongolite showed that the purple spongolite had a significantly higher phosphorous retention than the other colours. However, FIG. 20b, which is the results of testing spongolite with a particles size smaller than 1 mm, shows the effect of particle size on phosphorous sorption. Per 1 g spongolite the surface area for the smaller particles is larger and thus has more potential for P sorption as shown for most colours when comparing FIG. 20a and FIG. 20b.

Test 2—Comparison of PRI of Different Coloured Spongolite after Calcining

In a second test, spongolite particles of the different colours were calcined at temperatures between 400-800° C. in 50 degree steps to identify ideal calcining temperatures.

Figure 21:
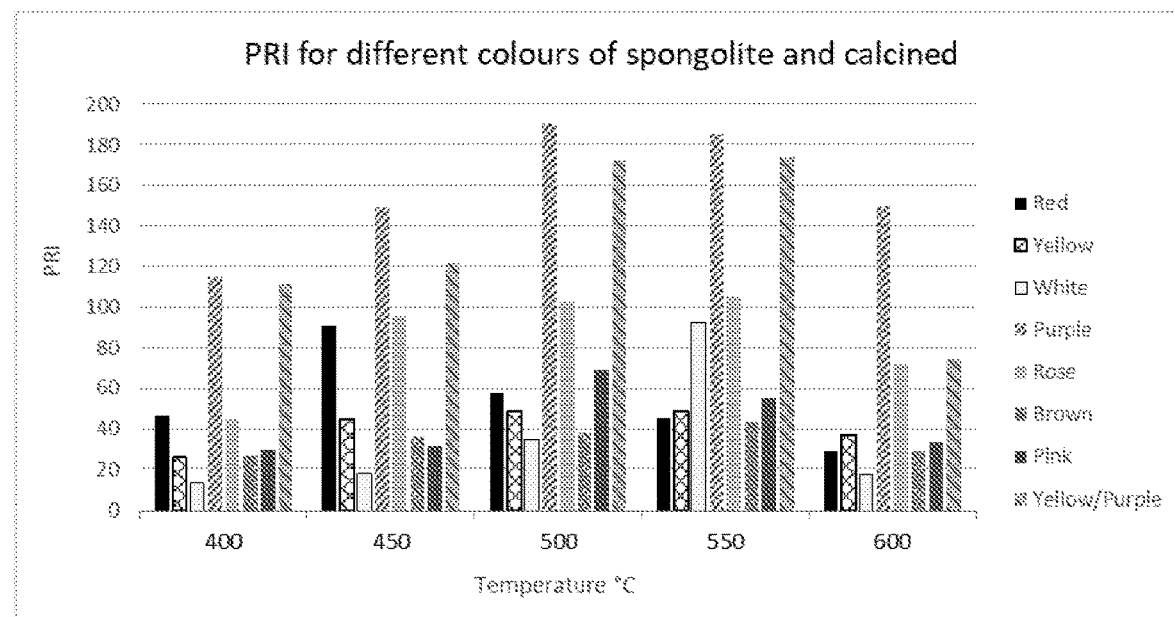
FIG. 21 is a graph showing a comparison of PRIs of different coloured spongolite after calcining.

Results of the calcining test of the different coloured spongolite are shown in FIG. 21. The diagram shows that for most colours there was a temperature optimum for maximum phosphorous binding (PRI). The two purple spongolite samples showed the highest PRIs, up to a PRI of 190. For the red spongolite, the optimum calcining temperature was at 450° C. which is lower than the temperature optimums for the other colours, which were 500° C. (yellow, purple, pink rose) and 550° C. (yellow/purple, white, brown). For all colours of spongolite, there is a clear trend such that, with increasing temperature, PRIs increase until they reach their optimum and then drop gradually.

Test 3—Comparison of PRI of Different Coloured Spongolite after Ferrous Treatment and Calcining In a second test, spongolite particles of the eight different colours were soaked in a 10% ferrous sulphate solution for 2 hours. To determine the optimum calcining temperature for the different coloured spongolite, samples of each colour were calcined at either 600° C., 625° C., 650° C., 675° C. or 700° C.

Figure 22:
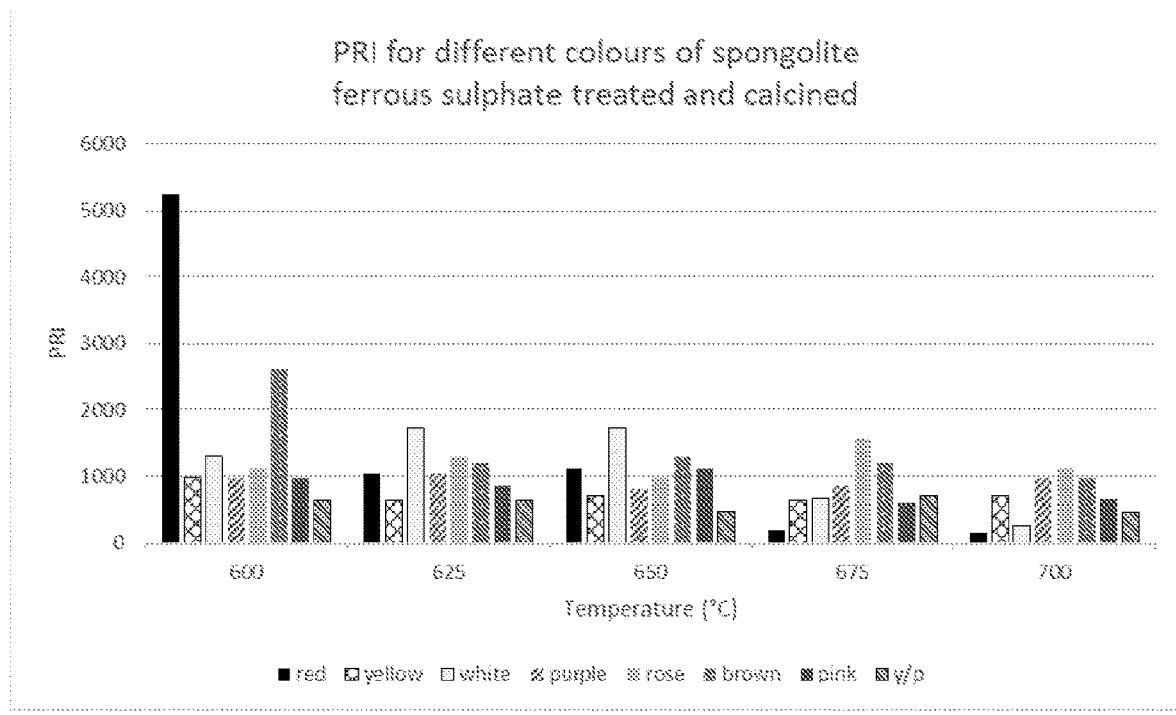
FIG. 22 is a graph showing the PRIs of different colours of ferrous sulphate soaked spongolite at increasing calcining temperatures.

The PRI test showed that spongolite of different colours exhibited varying phosphorous sorption at different calcining temperatures (FIG. 22).

The PRI of the red spongolite calcined at 600° C. was markedly higher (PRI 5200) than the other tested spongolite (on average PRI 1000), but also had the lowest PRI (PRI 150) of all samples tested at temperatures higher than 675° C. The brown spongolite also had its highest PRI (2600) at 600° C. and PRI values decreased with increasing temperature. The PRI of the white spongolite was highest at 625-650° C. (1700) and decreased with increasing temperatures (PRI 250 at 700° C.). The PRI of yellow, rose, purple, pink and yellow/purple spongolite varied at the different temperatures, but did not exhibit as strong PRI changes as seen for white, brown and especially red spongolite.

Figure 23:
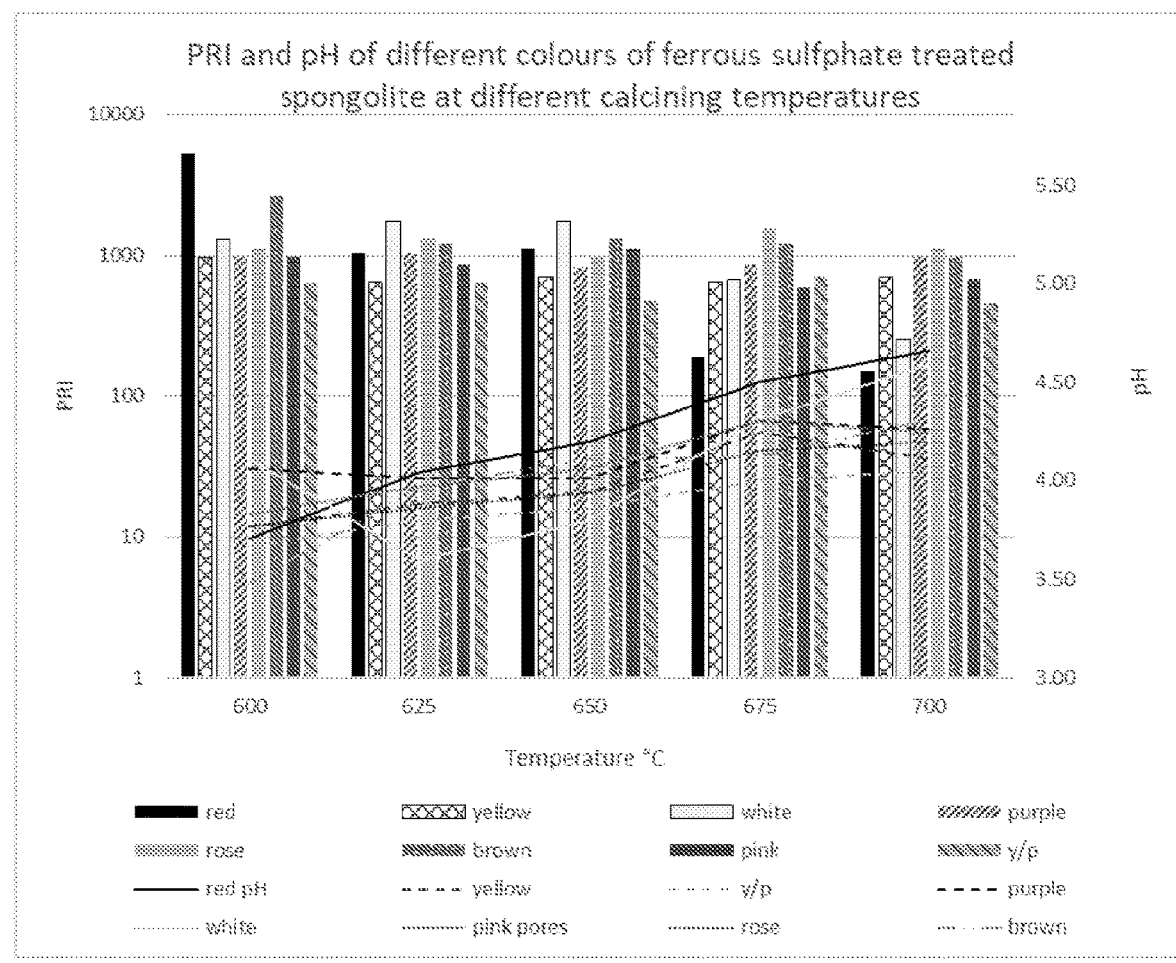
FIG. 23 is a graph showing the PRI and pH of different colours of spongolite at temperatures between 600-700° C.

The pH of the supernatant solution was tested for all samples (FIG. 23). FIG. 23 shows the relationship between PRI values (on a logarithmic scale) and the pH of the supernatant solution in each of the samples. The phosphorous solution added to the spongolite for the PRI testing was acidic (pH 5.51). By adding the spongolite and the phosphorous solution into a test vessel, this solution became more acidic during the test, as the pH results of the supernatant solution showed (pH between 3.48 and 4.66).

As FIG. 23 shows, there is a possible connection between the PRI and the pH of each sample. For four samples (red, yellow, white, brown), at low pH (3.48-3.80), the PRI of the sample was highest. At 600° C., the pH of the red spongolite was lowest (3.71) while simultaneously the PRI was highest. With increasing temperature, the pH increased steadily up to 4.66 while the PRI was at its lowest (150). The pH of the white spongolite was lowest at 625-650° C., while the PRI was highest. Statistically, a strong correlation between the pH of the solution and the PRI was determined for the red, brown and white spongolite ($R2 \geq 0.76$), and a possible correlation for the yellow spongolite ($R^2=0.43$).

The other four colours had their highest PRIs between pH 4.0 and pH 4.1. Notably the latter four samples had a similar colour (rose, purple, pink pores and yellow/purple). However, these samples did not show a strong correlation between pH of the solution and the PRI.

It was postulated that the different PRIs for the different spongolite colours related to slight variations in composition. Previous tests showed that spongolite of different colours had differences in silica minerals, clays and trace elements. Thus, depending on the composition of the types of silica minerals, the effective surface area of the spongolite may be different for the different colours. Amongst other trace elements such as manganese and copper, spongolite contains high amounts of aluminium and iron.

Colours that were tested in this study (Example 5) were: white, purple, yellow and yellow/purple stripes. The white spongolite had the highest amount of aluminium (31 mg/g), but also the lowest amount of iron (6 mg/g). In contrast, the yellow spongolite had the highest iron (68 mg/g) and lowest aluminium content (12 mg/g). Spongolite with yellow/purple stripes and the purple spongolite were in the range of 20-25 mg/g aluminium and 31-54 mg/g iron. Given that the purple spongolite showed the highest PRI in the test of untreated spongolite (FIG. 20a and FIG. 20b) but did not exhibit the highest iron concentrations compared to other colours, it was concluded that hitherto unidentified compounds other than iron may contribute to the phosphate sorption. For the reason that calcium and magnesium in soils can bind to phosphate, the calcium and magnesium content of spongolite has also been tested as shown in Example 5. Calcium and magnesium contained in spongolite is relatively low (less than 0.2% magnesium) when compared to the amounts of metal (up to 7% iron)

It is postulated that the calcining process may also affect the trace elements in the spongolite composition. Calcining improves phosphate sorption of untreated spongolite which was then further improved when spongolite is soaked in a metal sulphate before calcining as described above. When treated with ferrous sulphate, the calcining process was postulated to bind iron to the surface of the spongolite and also to lift the oxidation state of iron to +3. As phosphate is charged (oxidation state of −3 in solution), phosphate molecules are more strongly attracted by iron.

Comparing the untreated spongolite (FIG. 21) to the treated spongolite (FIG. 22) the PRI was improved by 73-fold on average. At temperatures between 600-700° C., the improvement of the PRI for the red spongolite was between 15 to 500-fold. All other colours of spongolite were within the range and do not fluctuate as much with increasing temperature.

Example 11: Nitrogen Retention Capability

A nitrogen sorption assay has been developed to determine nitrogen sorption onto spongolite. This assay is derived from the phosphorous retention index to produce results easy to compare through an index. The nitrogen sorption is further described as the nitrogen retention index (NRI). The test procedure follows the PRI procedure as described in Example 1 with the following modifications for nitrogen sorption.

The source of nitrogen was nitrate in the form of potassium nitrate. The equilibration solution contained 10 mg/l nitrogen. 2 g of spongolite were tumbled for 16 hours in a test vessel containing 40 ml of the equilibration solution. The supernatant nitrogen concentration was determined via Palintest Nitratest method.

The test results are shown in Table 14. The results did not show a clear trend of nitrate sorption as only one of the three samples of the untreated control group and the ferrous sulfate treated and calcined group showed a reduction in nitrate in the supernatant concentration.

TABLE 14

Nitrate-N sorption with potassium nitrate

| Sample ID | Nitrate-N mg/l | NRI |
|---|---|---|
| CG1 (I1) | 10.6 | −1 |
| CG2 (I2) | 8.0 | 5 |
| CG3 (I3) | 15.0 | −7 |
| FS1 (J1) | 11.6 | −3 |
| FS2 (J2) | 11.6 | −3 |
| FS3 (J3) | 8.4 | 4 |

The fluctuations of the test results might be caused by interferences. Therefore, other sources of nitrate were tested as well as spongolite treated with other metals. The results are shown in Table 15.

TABLE 15

Nitrate-N sorption with potassium nitrate ($KNO_3$), ammonium nitrate ($NH_4NO_3$) and nitric acid ($HNO_3$)

| Metal Treatment | Concentration N mg/l | NRI for specific nitrogen source | | |
|---|---|---|---|---|
| | | KNO3 | NH4NO3 | HNO3 |
| Fe | 10 (17 HNO3) | −1 | 0 | 30 |
| Fe | 100 (170 HNO3) | −1 | | 18 |
| Cu | 10 (17 HNO3) | 90 | 23 | 123 |
| Cu | 100 (170 HNO3) | 4 | | 276 |
| Mn | 10 (17 HNO3) | 1 | −2 | 2 |
| Mn | 100 (170 HNO3) | −1 | | 14 |

Table 15 shows nitrate sorption varied depending on the metal treatment of the spongolite. Generally, highest nitrate sorption was achieved for copper sulphate treated spongolite, however, results still show great variation. The differences among the different sources of nitrate are likely to be caused by pH variations, because the equilibration concentration with nitric acid ($HNO_3$) was more acidic than the solutions containing ammonium nitrate or potassium nitrate. Highest achieved NRI in this test series was 276 for copper sulphate treated spongolite. However, the method requires further testing to exclude other interferences with the analytical method.

Example 12: Industrial Calcining

To investigate the calcining process of treated and untreated spongolite on a larger industrial scale, spongolite was calcined in a furnace in the workshop of Hofmann Engineering (Perth, Western Australia).

As part of their furnace operation routine, the furnace is heated up to 470° C.-490° C. degrees and hold at that temperature for 40 hours. Ramp up and ramp down times of each 15-20 hours extend the time of heat exposure of the material.

Figure 24:
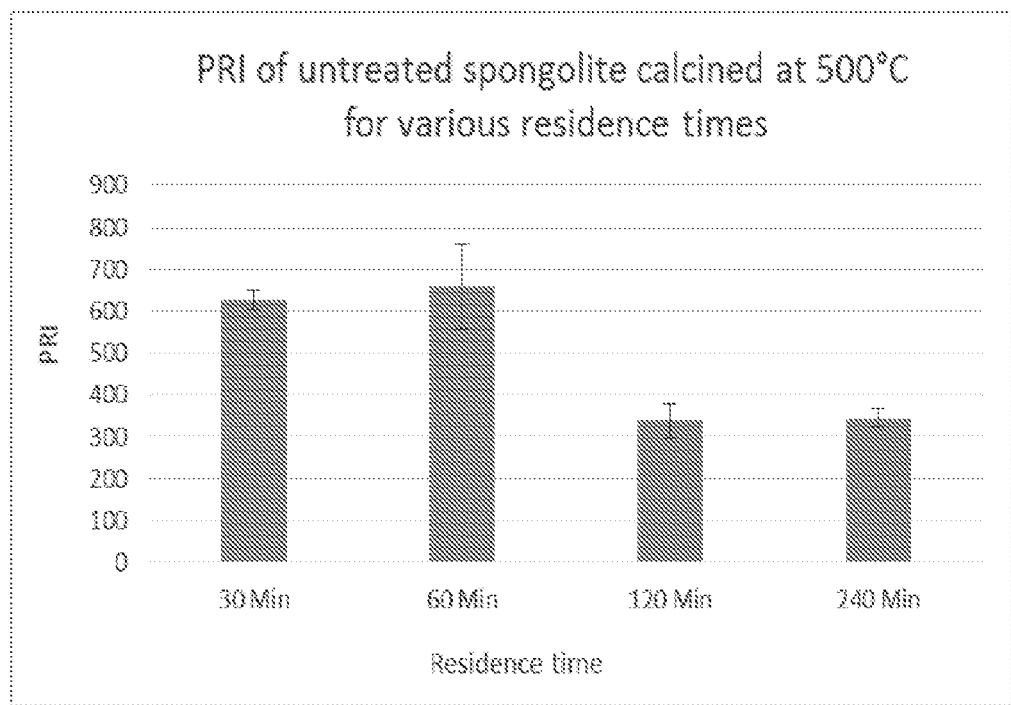
FIG. 24 is a graph showing the PRI of untreated spongolite calcined at 500° C. for various residence times.
Figure 25:
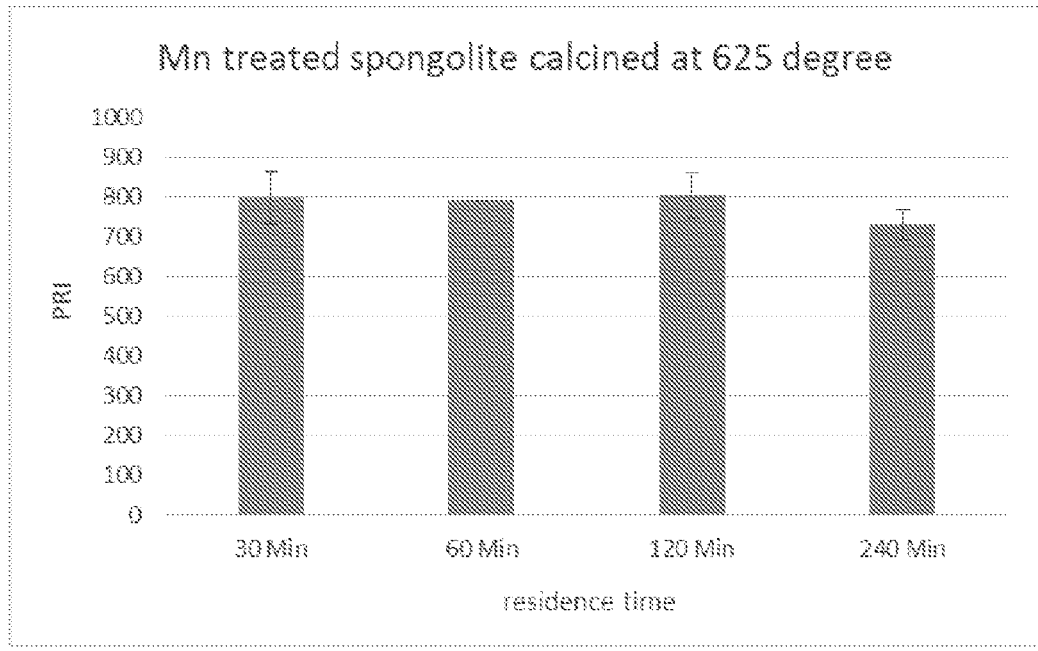
FIG. 25 is a graph showing the PRI of manganese treated spongolite calcined at 625° C. for various residence times.
Figure 26:
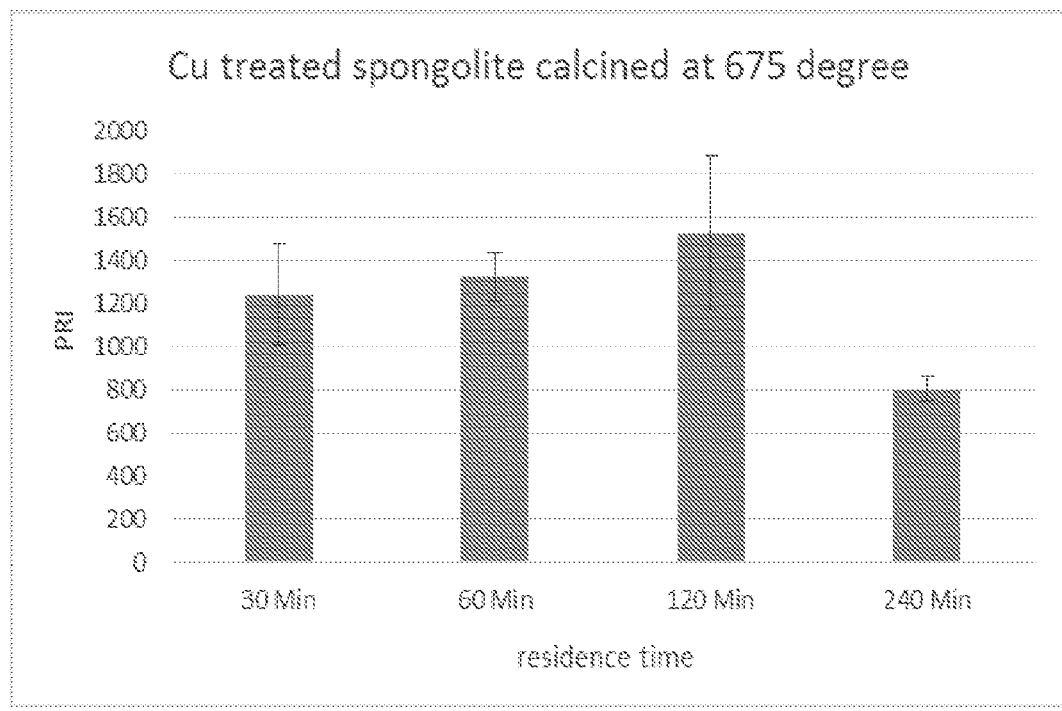
FIG. 26 is a graph showing the PRI of copper treated spongolite calcined at 675° C. for various residence times.
Figure 27:
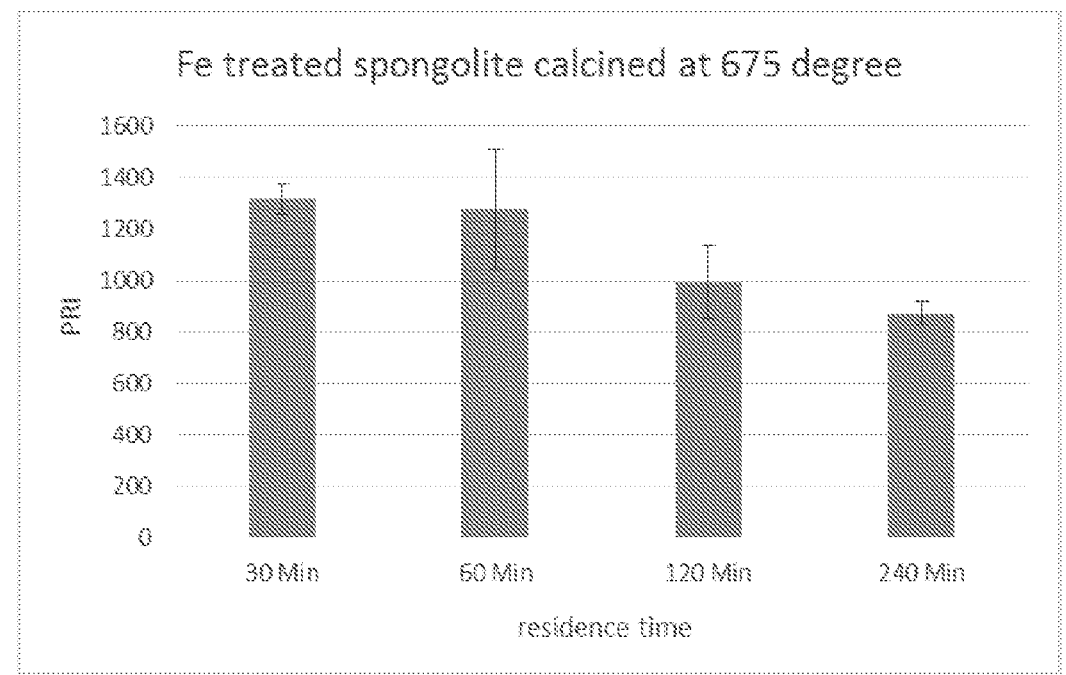
FIG. 27 is a graph showing the PRI of iron treated spongolite calcined at 675° C. for various residence times.

In previous laboratory tests, optimum calcining temperatures for ferrous sulfate treated and untreated spongolite (control group) were determined. The test results are shown in FIG. 24. For untreated spongolite the optimum calcining temperature is between 450° C. and 500° C. which is lower than for ferrous sulfate treated spongolite (650° C.-700° C.).

TABLE 16

Optimum Calcining Temperature of treated and untreated spongolite

| Sample ID | Opt. Calcining Temperature (° C.) | PRI |
|---|---|---|
| Untreated | 500 | 248 |
| Ferrous Sulfate | 675 | 653 |
| Copper Sulfate | 675 | 830 |
| Manganese Sulfate | 625 | 519 |

It is anticipated that the calcining temperature at Hofmann Engineering will match the optimum calcining temperature of untreated spongolite. The peak temperature of the calcining process was lower than the optimum calcining temperature for metal treated spongolite as determined in the laboratory. Due to the long residence time of over 40 hours, it is further anticipated that the treated spongolite might complete the calcining process although below optimum temperature.

Laboratory Tests to Prepare Spongolite for Calcining at Hofmann Engineering

Washing and drying the material on an industrial scale is time consuming and requires large amounts of water. For further understanding of the significance of the preparation process including washing and drying a small test series was conducted in the laboratory.

Tests were aiming at maximising PRI whilst simplifying the procedure by not rinsing the spongolite. All spongolite samples in this test underwent metal treatment (soaking in 10% ferrous sulfate for 2 hours). The results show that rinsing and drying the spongolite prior to metal treatment (control group) produced higher PRIs then soaking unwashed spongolite (not rinsed) in the metal sulfate solution. Washing the spongolite after the metal treatment also decreased the PRI compared to the control group. Hence, the recommended procedure is washing and drying the spongolite, and not rinsing it wafter the metal treatment.

Adding extra soaking solution to the crucible increased the PRI (PRI 783) compared to the control (PRI 669). The PRI could be further increased (PRI 1223) when adding a lid to the sample containing added soaking solution. This effect did not occur when a lid was added to drained spongolite (control group), but slightly decreased the PRI.

TABLE 17

Comparison of Calcining Conditions (All samples were soaked for 2 hours in 10% ferrous sulfate solution)

| Sample ID | Calcining information | PRI |
|---|---|---|
| Control | Rinsed and dried before soaking | 669 |
| Not Rinsed | Not rinsed before or after soaking | 458 |
| Rinsed Soak | rinsed after soaking | 439 |
| Lid | Not rinsed, crucible with lid | 611 |
| Soak | Not rinsed, crucible topped up with soaking solution | 783 |
| Soak + lid | Not rinsed, crucible topped up with soaking solution + lid | 1223 |

The calcining process of metal treated spongolite left staining in the calcining vessels (crucible), especially when containing extra soaking solution. For the calcining of spongolite at the facilities of Hofmann Engineering, staining of the furnace is to be avoided. This lead to a test series of drying spongolite samples after soaking in the metal sulfate solution to prevent water vapour "splashing" the crucible. The test of calcining dry spongolite was successful as such the crucible was almost stainless. However, the spongolite treatment was slightly less effective than the wet calcining of treated spongolite. The PRI of ferrous sulfate treated and dried spongolite was on average 547 instead of 653 when calcined wet.

As described above, drying before calcining reduced P sorption. On the other hand, extra solution increases the PRI which leads to the assumption that not only the additional iron, but also the water influences the modification of spongolite during the calcining process.

Preparation of the Spongolite

Four IBCs filled with spongolite were prepared to be calcined at Hofmann Engineering. These four batches of spongolite were prepared differently to identify necessary steps in the preparation process to simplify the procedure for time and cost savings. For previous testing in the laboratory, spongolite was washed and dried before further processing. The four different batches were stored in bulker bags in the open air from 27 September until 10-23 Oct. 2018, and prepared as follows.

TABLE 18

Preparation of IBCs

| Sample ID | Washing Procedure | Moisture Content (%) |
|---|---|---|
| IBC #4 | Rinsed in bulker bag with approx. 3000 L(10/10/2018), air dried until screened (23/10/2018) | 23.2 |
| IBC #15 | Only air dried (6 hours) | 22.2 |
| IBC #41 | Not washed, screened, air dried (8 hours) | 12.1 |
| IBC #56 | Washed, screened, air dried (55.5 hours) | 11.7 |

Additionally, three smaller cages were prepared, each containing metal treated and dried spongolite. The three metal treatments were ferrous sulfate (15%), copper sulfate (12%) and manganese sulfate (9%). To reduce the risk of staining, these samples were air dried and the cages each placed in the middle of an IBC containing untreated spongolite (Table 19).

TABLE 19

Cage and IBC Number

| Cage ID | IBC |
|---|---|
| Ferrous Sulfate | #41 |
| Copper Sulfate | #15 |
| Manganese Sulfate | #4 |

Calcining

The spongolite was calcined between 13-16 November. After 15-20 hours ramp up time, 470-490° C. were hold for 40 hours, followed by another 15-20 hours ramp down time.

Results

Samples were taken from the top and the middle of the IBC due to expected low heat conductivity of the spongolite and associated differences in heat exposure.

TABLE 20

PRI of untreated spongolite

| Sample ID | PRI top | PRI middle |
|---|---|---|
| IBC #4 | 27 | 16 |
| IBC #15 | 31 | 42 |
| IBC #41 | 60 | 32 |
| IBC #56 | 37 | 48 |

With exemption of Sample #4 middle, the calcining increased PRIs in comparison to laboratory results of washed but untreated spongolite (PRI of 26) and completely untreated spongolite (PRI of 14). The measured PRIs between 16 and 60 were surprisingly low as values of 200 and more were previously achieved in laboratory tests for untreated spongolite. There is no clear trend of samples from the top or middle having higher PRIs so the impact of low heat conductivity was unlikely. The spongolite of all IBCs had undergone a colour change which is typical for the calcining process. It was unclear whether the spongolite had not yet reached its optimum or had been exposed too long. When testing for ideal calcining temperatures, higher temperatures lead to a decrease in PRI which might have happened due to the long residence time. Further tests to determine optimal residence time were conducted in the laboratory.

From the given results it is not possible to conclude whether washing or screening was worthwhile.

PRI results for the metal treated spongolite were also lower than expected when comparing Table 16 and Table 21), following a similar trend as the untreated spongolite.

TABLE 21

PRI metal treated spongolite

| Sample ID | PRI |
|---|---|
| Ferrous Sulfate | 491 |
| Copper Sulfate | 576 |
| Manganese Sulfate | 305 |

Re-Calcining

The samples taken from the four IBCs after calcining at Hofmann Engineering were re-calcined in the muffle furnace in the laboratory to determine if samples were not fully calcined or "overcooked".

Bioscience had stored subsamples of the material prior to calcining which could now be used as a reference. Because the material in all four IBCs behaved similarly, only IBC #4 was analysed. The following three samples were crushed and sieved to reach 1-2 mm size and subsequently calcined at 500° C. for 30 minutes.

TABLE 22

PRI metal treated spongolite

| Sample ID | PRI before | PRI after |
|---|---|---|
| #4 Calcine | — | 263 |
| #4 top re-calcine | 27 | 54 |
| #4 middle re-calcine | 16 | 58 |

After successful calcining the PRI of the re-calcined samples should have gone up to 263 as for the reference sample #4 Calcine. It is anticipated that the spongolite was calcined at the optimum temperature, but has been exposed the heat for too long which lead to a reduction of P sorption.

Optimum Residence Time

These findings lead to the question of optimum residence times for calcining which has only been tested for 30 minutes. In this test series spongolite samples were calcined for 30, 60, 120 and 240 minutes. Untreated, iron, copper and manganese treated spongolite was compared. Generally, 30-60 minutes residence time produced highest PRIs, which is beneficial because short calcining times keep costs for heating low. PRIs for the copper treatment seemed higher at 120 minutes, but variation between the three replicates were enormous (1165, 1402 and 2011). The two lower replicates were consistent with results from the 30 and 60 minute samples meaning the benefit from calcining for 120 minutes is unlikely.

Spongolite with copper or manganese treatment tolerates longer calcining times slightly better than iron treated or untreated spongolite.

TABLE 23

PRI of spongolite at different residence times

| Sample ID | PRI 30 min | PRI 60 min | PRI 120 min | PRI 240 min |
|---|---|---|---|---|
| untreated | 626 | 662 | 340 | 346 |
| Ferrous sulfate | 1316 | 1276 | 992 | 871 |
| Copper sulfate | 1240 | 1323 | 1526 | 805 |
| Manganese Sulfate | 799 | 789 | 803 | 730 |

The invention claimed is:

1. A method for sorption of phosphorous and/or nitrogen from a liquid, the method comprising the steps of:
    i) calcining spongolite and/or treating spongolite with a soluble metal cation solution;
    ii) contacting the liquid with a composition comprising the calcined and/or soluble metal treated spongolite.

2. The method according to claim 1 wherein the liquid is water or an aqueous solution.

3. The method according to claim 1 wherein the phosphorous sorbed from the liquid is in the form of phosphate and/or the nitrogen sorbed from the liquid is in the form of nitrate or nitrite.

4. The method according to claim 1 wherein the calcining occurs:
    a) at a temperature selected from any temperature within a range of 400° C. to 800° C.; and/or
    b) for a period of time of between 30 minutes and 7 days.

5. The method according to claim 1 wherein the soluble metal cation is metal cation of iron, copper, manganese, magnesium, aluminium, vanadium or calcium.

6. The method according to claim 1 wherein the soluble metal cation is in the form of a metal salt in the form of a sulphate salt, carbonate salt or chloride salt.

7. The method according to claim 1 wherein the soluble metal cation treatment is carried out:
    a) using a soluble metal cation in the form of a metal salt at a concentration of between 1-20% (w/w) metal salt;
    b) using a soluble metal cation at a concentration of between 0.1-5% (w/w) metal cation; and/or
    c) for a period of time between 10 minutes and 7 days.

8. The method of claim 1 wherein the method further comprises treating the spongolite with a soluble metal cation solution and then calcining the spongolite before contacting the liquid with the composition.

9. The method of claim 1 wherein the method further comprises calcining the spongolite and then treating the spongolite with a soluble metal cation solution before contacting the liquid with the composition.

10. A composition for sorption of phosphorous and/or nitrogen from a liquid, said composition comprising calcined spongolite and/or soluble metal treated spongolite.

11. A kit for sorption of phosphorous and/or nitrogen from a liquid, the kit comprising:
   a) a composition comprising calcined spongolite and/or soluble metal treated spongolite; and
   b) instructions for use.

* * * * *